US012786227B2

(12) United States Patent
Sankhala et al.

(10) Patent No.: US 12,786,227 B2
(45) Date of Patent: Nov. 3, 2026

(54) DETECTION AND HANDLING A ANOMALOUS ACTIVITY BY A REMOTE ENTITY OVER A COMMUNICATION NETWORK

(71) Applicant: MASTERCARD INTERNATIONAL INCORPORATED, Purchase, NY (US)

(72) Inventors: Rupesh Kumar Sankhala, Churu (IN); Ankur Saraswat, Gurugram (IN); Siddharth Vimal, Chandigarh (IN); Yatin Katyal, Rohtak (IN)

(73) Assignee: MASTERCARD INTERNATIONAL INCORPORATED, Purchase, NY (US)

( * ) Notice: Subject to any disclaimer, the term of this patent is extended or adjusted under 35 U.S.C. 154(b) by 37 days.

(21) Appl. No.: 18/959,593

(22) Filed: Nov. 25, 2024

(65) Prior Publication Data

US 2026/0149732 A1 May 28, 2026

(51) Int. Cl.
*H04L 9/40* (2022.01)

(52) U.S. Cl.
CPC ................................ *H04L 63/1441* (2013.01)

(58) Field of Classification Search
CPC .................................................. H04L 63/1441
USPC ............................................................ 726/23
See application file for complete search history.

(56) References Cited

U.S. PATENT DOCUMENTS

| | | | | |
|---|---|---|---|---|
| 9,641,544 | B1 * | 5/2017 | Treat | H04L 43/04 |
| 2014/0380456 | A1 * | 12/2014 | Demopoulos | H04L 63/1458 726/22 |
| 2023/0090205 | A1 * | 3/2023 | Yehezkel | H04L 63/1425 726/23 |

* cited by examiner

*Primary Examiner* — Bryan F Wright
(74) *Attorney, Agent, or Firm* — Barta Jones, PLLC

(57) ABSTRACT

The invention enables detecting and handling threats or malicious activity in network-based communications and/or transactions. In an embodiment of the invention, a data message is received from a remote entity, wherein said first data message includes a first originating internet protocol (IP) address. A data message record having a second originating IP address that matches the first originating IP address, is identified from among a stored set of data message records. The identified data message record is parsed to extract data that identifies the second originating IP address as legitimate or anomalous. Responsive to determining that the second originating IP address is anomalous, a processor implemented instance of a threat handling process flow may be implemented. The determination that the second originating IP address is anomalous may be performed based on a combination of outputs from a variational autoencoder and a graph neural network.

18 Claims, 14 Drawing Sheets

DETECTION AND HANDLING A ANOMALOUS ACTIVITY BY A REMOTE ENTITY OVER A COMMUNICATION NETWORK

FIELD OF THE INVENTION

The present invention relates to the domain of network-based communications and transactions, and more particularly to methods, systems and computer program products for detecting and handling threats or malicious activity in network based communications and/or transactions.

BACKGROUND OF THE INVENTION

The prevalence of the internet has led to a significant increase in security threats related to network-based communications, and/or to electronic transactions. With increasing incidence of data breaches, data theft and fraudulent transactions being carried out by malicious entities, network security and transaction security is becoming increasingly important.

FIG. 1 illustrates an exemplary system environment 100 configured for enabling electronic transactions. System environment 100 includes a remote entity 102 that initiates an electronic transaction within system environment 100. The remote entity may be a legitimate entity 1022 (i.e. an entity that is authorized to perform the proposed transaction) or a malicious entity 1024 (i.e. an entity that is not authorized to perform the proposed transaction, and which seeks to unauthorizedly perform the proposed transaction by spoofing the identity of a legitimate entity).

The electronic transaction under implementation involves a payment account associated with legitimate entity 1022 and maintained at issuer platform 106—and the remote entity 102 initiating the transaction communicates with and sends transaction initiation instructions to issuer platform 106 through network 104. Pursuant to successful verification/validation of an identity of legitimate entity 1022 by authentication platform 110, issuer platform 106 transfers a transaction amount that has been specified by legitimate entity 1022 from a payment account held in the name of said legitimate entity 1022 at issuer platform 106, to an authorized destination 108.

In one kind of malicious attack within system environment 100, malicious entity 1024 sends electronic communications to issuer platform 106, wherein said electronic communications attempt to spoof an identity of a legitimate entity 1022, and to thereby initiate an electronic transaction that transfers a transaction amount from a payment account held in the name of a legitimate entity 1022 at issuer platform 106, to an unauthorized destination 112. By successfully spoofing the identity of a legitimate entity 1022, malicious entity 1024 deceives authentication platform 110 into erroneously authenticating/validating the identity of malicious entity 1024, whereafter the process of misappropriating funds from a payment account held at issuer platform 106 is carried out.

It would be understood that the above instances is only one example of malicious attacks that occur within or using electronic networks.

One of the existing mechanisms for detecting and handling malicious attacks is by monitoring internet protocol (IP) addresses from which a data message or data requests originate—i.e. by monitoring IP addresses of remote entities from which data messages or data requests are received. By comparing an IP address of a remote entity against a database of known IP addresses (e.g. by comparing the IP address against a blacklist or a whitelist of IP addresses), the bonafides of a remote entity can be assessed by way of a security measure.

This mechanism (as well as other rule-based heuristics) that are presently known in the art, is premised on an IP address being previously correctly tagged or labelled as being associated with a malicious entity or with a legitimate entity. However, as a result of imperfect information availability, as well as imperfect information sharing, available databases of known blacklisted or whitelisted IP addresses are more often than not insufficient to successfully identify every threat.

There is accordingly a need for solutions that optimize recognition or classification of IP addresses as malicious or legitimate—so as to enable improved network security and transaction security.

BRIEF DESCRIPTION OF THE ACCOMPANYING DRAWINGS

SUMMARY

Figure 1:
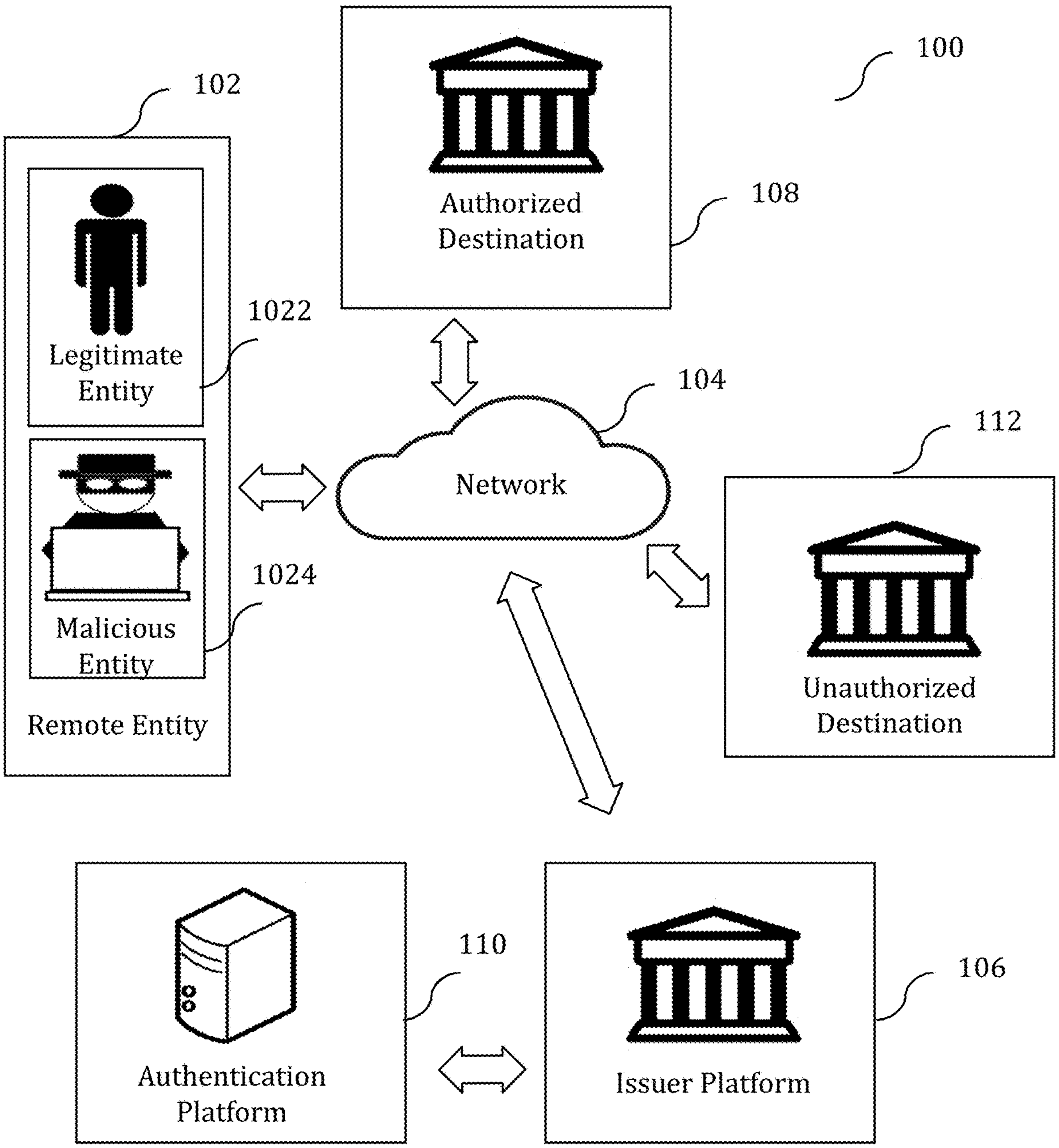
FIG. 1 illustrates an exemplary system environment configured for enabling electronic transactions.

The present invention relates to the domain of network-based communications and transactions, and more particularly to methods, systems and computer program products for detecting and handling threats or malicious activity in network based communications and/or transactions.

The invention provides a computer implemented method for detection of anomalous activity by a remote entity over a communication network. The method comprises implementing at a processor, the steps of (i) receiving a data message from a remote entity, wherein said first data message includes a first originating internet protocol (IP) address, (ii) identifying a data message record from among a set of stored message data records, wherein the identified data message record includes a second originating IP address, and wherein the second originating IP address matches the first originating IP address, (iii) parsing a data field within the identified data message record and extracting from the parsed data field, data that identifies the second originating IP address as legitimate or anomalous, and (iv) responding to determining based on the extracted data, that the second originating IP address is anomalous, initiating a processor implemented instance of a threat handling process flow.

In performing the method, (i) at least one stored message data record within the set of stored message data records, includes identifier data that identifies an originating IP address within said stored message data record as either legitimate or anomalous, and (ii) the identifier data within the stored message data record has been generated by performing the steps of (a) receiving request parameter data corresponding to a data message, (b) encoding the message parameter data at an encoder within a variational autoencoder, (c) decoding the encoded data using a decoder within the variational autoencoder, (d) determining a reconstruction error associated with output from the decoder, and (e) generating identifier data (i) that identifies the originating IP address within said stored message data record as legitimate when the reconstruction error is less than a predefined error threshold, or (ii) that identifies the originating IP address within said stored message data record as anomalous when the reconstruction error is more than a predefined error threshold.

In an embodiment of the method, a state of the identifier data within the stored message data record has been modified by performing the further steps of (i) retrieving from a database, historical data identifying IP addresses that have been associated with anomalous activity, and (ii) responding to a determination that an IP address identified by the historical data as having been associated with anomalous activity matches the originating IP address within said stored message data record, by modifying the identifier data within the stored message data record to identify the originating IP address within said stored message data record as anomalous.

The invention also provides a system for detection of anomalous activity by a remote entity over a communication network. The system comprises at least a processor implemented variational autoencoder and a processor implemented graph neural network, wherein the system is configured to perform the steps of (i) receiving a data message from a remote entity, wherein said first data message includes a first originating internet protocol (IP) address, (ii) identifying a data message record from among a set of stored message data records, wherein the identified data message record includes a second originating IP address, and wherein the second originating IP address matches the first originating IP address, (iii) parsing a data field within the identified data message record and extracting from the parsed data field, data that identifies the second originating IP address as legitimate or anomalous, and (iv) responding to determining based on the extracted data, that the second originating IP address is anomalous, initiating a processor implemented instance of a threat handling process flow.

In an embodiment of the above system (i) at least one stored message data record within the set of stored message data records, includes identifier data that identifies an originating IP address within said stored message data record as either legitimate or anomalous, and (ii) the identifier data within the stored message data record has been generated by performing the steps of (a) receiving request parameter data corresponding to a data message, (b) encoding the message parameter data at an encoder within a variational autoencoder, (c) decoding the encoded data using a decoder within the variational autoencoder, (d) determining a reconstruction error associated with output from the decoder, and (e) generating identifier data (i) that identifies the originating IP address within said stored message data record as legitimate when the reconstruction error is less than a predefined error threshold, or (ii) that identifies the originating IP address within said stored message data record as anomalous when the reconstruction error is more than a predefined error threshold.

The invention also provides a computer program product for detection of anomalous activity by a remote entity over a communication network. The computer program product comprises a non-transitory computer readable medium having a computer readable program code embodied therein, wherein the computer readable program code comprises instructions for performing at, at least one processor, the steps of (i) receiving a data message from a remote entity, wherein said first data message includes a first originating internet protocol (IP) address, (ii) identifying a data message record from among a set of stored message data records, wherein the identified data message record includes a second originating IP address, and wherein the second originating IP address matches the first originating IP address, (iii) parsing a data field within the identified data message record and extracting from the parsed data field, data that identifies the second originating IP address as legitimate or anomalous, and (iv) responding to determining based on the extracted data, that the second originating IP address is anomalous, initiating a processor implemented instance of a threat handling process flow.

In an embodiment of the above described computer program product (i) at least one stored message data record within the set of stored message data records, includes identifier data that identifies an originating IP address within said stored message data record as either legitimate or anomalous, and (ii) the identifier data within the stored message data record has been generated by performing the steps of (a) receiving request parameter data corresponding to a data message, (b) encoding the message parameter data at an encoder within a variational autoencoder, (c) decoding the encoded data using a decoder within the variational autoencoder, (d) determining a reconstruction error associated with output from the decoder, and (e) generating identifier data (i) that identifies the originating IP address within said stored message data record as legitimate when the reconstruction error is less than a predefined error threshold, or (ii) that identifies the originating IP address within said stored message data record as anomalous when the reconstruction error is more than a predefined error threshold.

DETAILED DESCRIPTION

The present invention relates to the domain of network-based communications and transactions, and more particularly to methods, systems and computer program products for detecting and handling threats or malicious activity in network based communications and/or transactions.

For the purposes of describing the present invention, the terms “anomaly”, “anomalous”, “outlier”, and “irregularity” may be used interchangeably, and shall be understood as referring to an identified/detected state or behavior of any data, device or machine, that is abnormal or that is an outlier when compared with corresponding states or behavior of said data, device or machine, that are observed in network communications or electronic transactions involving legitimate entities.

Figure 2:
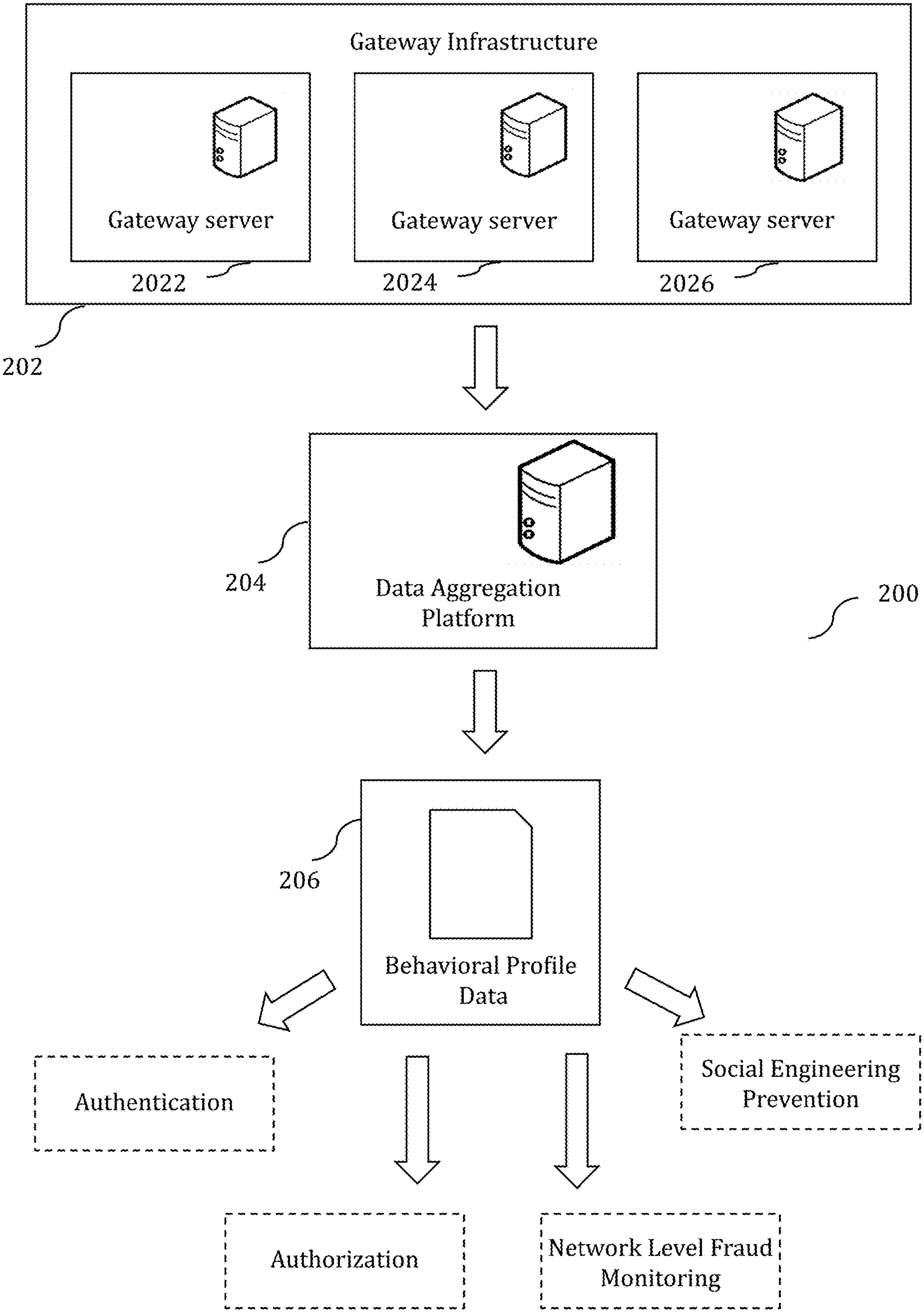
FIG. 2 illustrates a system environment configured for obtaining behavioral profile data corresponding to remote entities for the purposes of network security or transaction security.

FIG. 2 illustrates a system environment 200 configured for obtaining behavioral profile data corresponding to remote entities for the purposes of network security or transaction security. The obtained behavioral profile data may be used for the purposes of anomaly detection, threat avoidance, threat detection, anomaly handling and/or threat prevention. System environment 200 comprises gateway infrastructure 202 and data aggregation platform 204.

Gateway infrastructure 202 comprises a plurality of gateway servers 2022, 2024, 2026 that are each configured to function as a gateway interface for receiving data messages from remote entities over a communication network (for example, over the internet). In an embodiment, one or more of gateway servers 2022 to 2026 comprise a processor implemented application programming interface (API) gateway server, that is configured to receive API request messages from remote entities over a communication network.

Data aggregation platform 204 is a processor implemented platform, that is configured to parse and extract behavioral profile data 206 based on data messages or data requests that have been transmitted to gateway infrastructure 202 from one or more remote entities. The behavioral profile data 206 comprises data corresponding to data parameters that can be used to profile or identify remote entities (from which the data messages or data requests have been transmitted) as being legitimate or malicious. Data aggregation platform 204 collects and stores the extracted behavioral profile data 206 in a database or memory.

Behavioral profile data 206 may include any data that represents network communication behavior of a remote entity and that is capable of being identified or parsed from data messages received from the remote entity. Behavioral profile data 206 may include any or all of the following network data message parameters: request length, response length, http request status code, response time, authorization latency, and a target URL identified in a data message. In an embodiment, behavioral profile data 206 is aggregated corresponding to each distinct IP address from which data messages are received at gateway infrastructure 202, to build to a behavioral profile of the remote entity that is using that IP address. Further said behavioral profile data 206 may be aggregated across different time intervals to build a general behavioral profile of a remote entity.

Stored behavioral profile data can be compared against real time behavior of remote entities, to ascertain whether the real time behavior matches a behavioral profile of a legitimate entity or a behavioral profile of a malicious entity. The results of the comparison(s) can, among other purposes, be used for implementing security measures, threat prevention measures, or threat handling measures—for example, for any of authentication, authorization, network level fraud monitoring and/or social engineering prevention.

Figure 3:
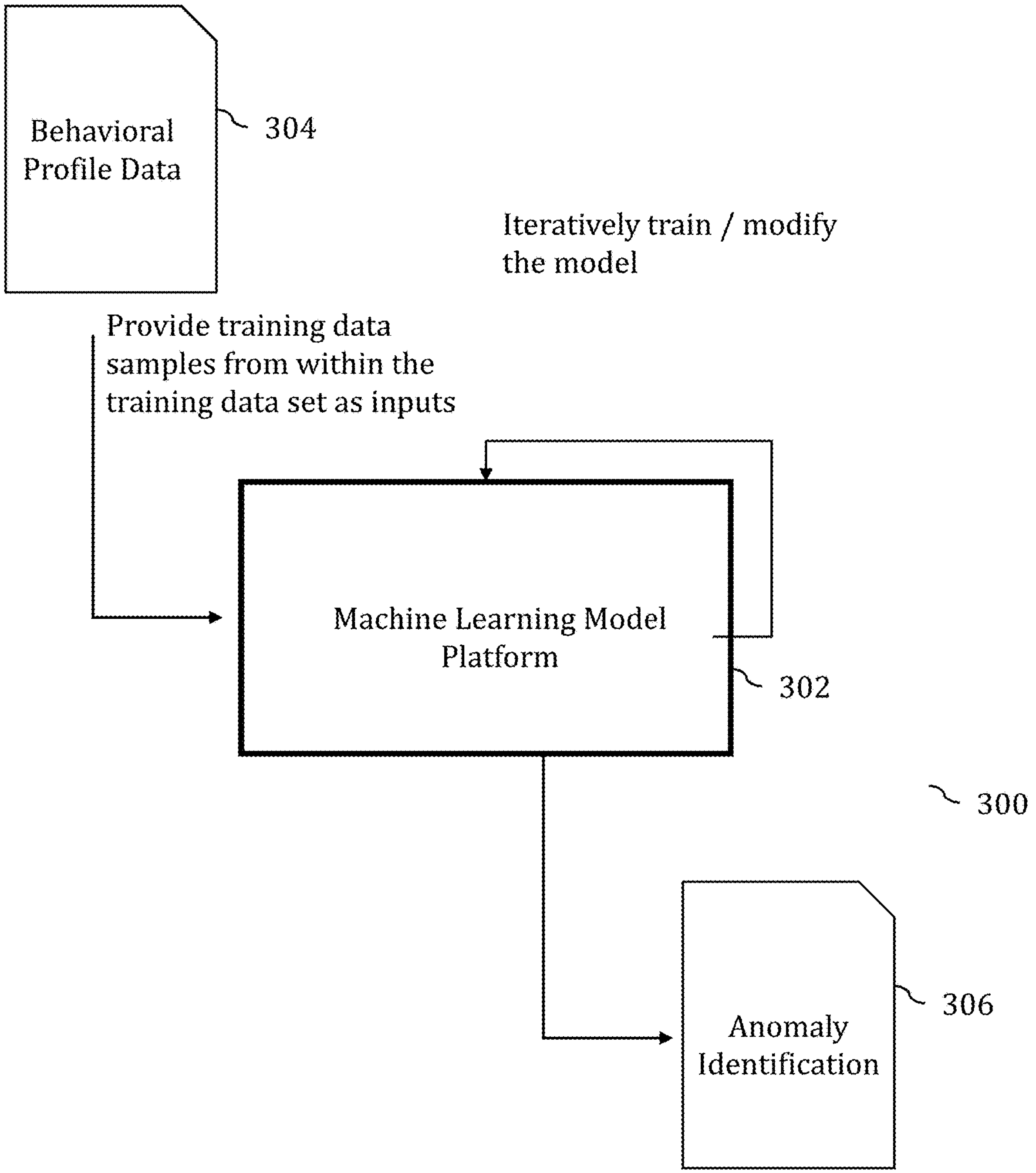
FIG. 3 illustrates a system environment configured for anomaly identification using a machine learning model platform, in accordance with teachings of the present invention.

FIG. 3 illustrates a system environment 300 configured for anomaly identification using a machine learning model platform 302, in accordance with teachings of the present invention.

Machine learning model platform 302 comprises one or more processor implemented machine learning models or neural networks configured in accordance with teachings of the present invention. The machine learning model(s) or neural network(s) within machine learning model platform 302 is/are trained using data samples from behavioral profile data 304 that has been obtained and stored in accordance with the description provided in connection with FIG. 2 or 3 above.

The machine learning model(s) or neural network(s) are iteratively trained or modified or configured using training data samples, until outputs generated from said machine learning model(s) or neural network(s) are found to satisfy (i) a defined acceptability criteria associated with the specific task for which each machine learning model or neural network is being trained, and/or (ii) a defined acceptability criteria associated with accuracy of anomaly identification achieved by machine learning model platform 302. The training or configuration of individual machine learning model(s) or neural network(s) within machine learning model platform 302 is described in more detail below.

Figure 4:
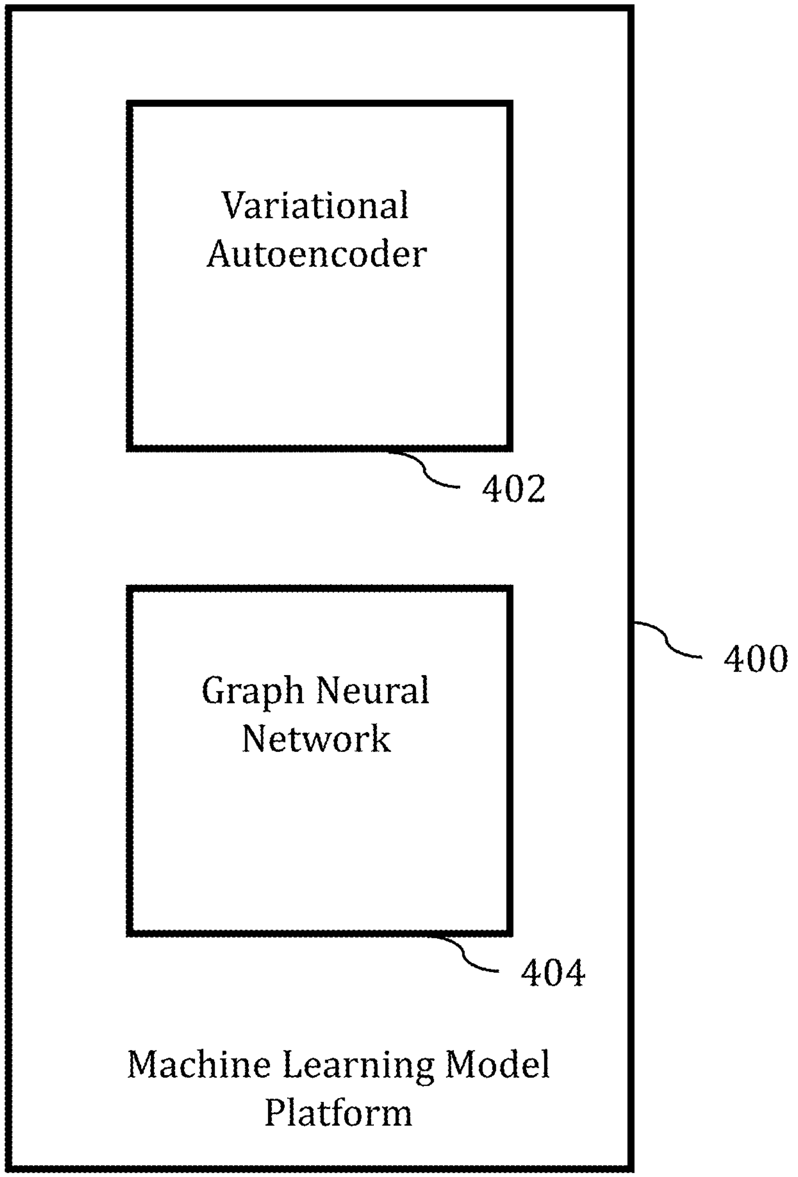
FIG. 4 illustrates an exemplary machine learning model platform configured for anomaly identification, in accordance with teachings of the present invention.

FIG. 4 illustrates an exemplary configuration of a processor implemented machine learning model platform 400 that is configured for anomaly identification, in accordance with teachings of the present invention.

Machine learning model platform 400 comprises a processor implemented variational autoencoder 402, and a processor implemented graph neural network 404.

Variational encoder 402 is trained and utilized to analyze real time behavior of remote entities, and to determine whether real time behavior of a remote entity is anomalous or is indicative of said remote entity being a malicious entity. Based on a determination by variational autoencoder 402, an IP address associated with a remote entity can be labelled or tagged to indicate that the IP address (and/or the remote entity sending data messages from that IP address) is malicious. Likewise, variational encoder 402 is trained and utilized to analyze real time behavior of remote entities, and to determine whether real time behavior of a remote entity is normal or is indicative of said remote entity being a legitimate entity. Based on a determination by variational autoencoder 402, an IP address associated with a remote entity can be labelled or tagged to indicate that the IP address (and/or the remote entity sending data messages from that IP address) is legitimate.

Graph neural network 404 is trained and utilized to predict links or connections between IP addresses, or remote entities associated with IP addresses. As a result, IP addresses or remote entities that may not have been identified as being malicious or anomalous based on real time behavior, can be identified as being malicious or anomalous based on a predicted link or connection with another IP address or remote entity that has been identified as being malicious or anomalous. Likewise, IP addresses or remote entities that may not have been identified as being legitimate based on real time behavior, can be identified as being legitimate based on a predicted link or connection with another IP address or remote entity that has been identified as being legitimate.

The configuration and operation of variational autoencoder 402 and of graph neural network 404 is described in more detail below.

Figure 5:
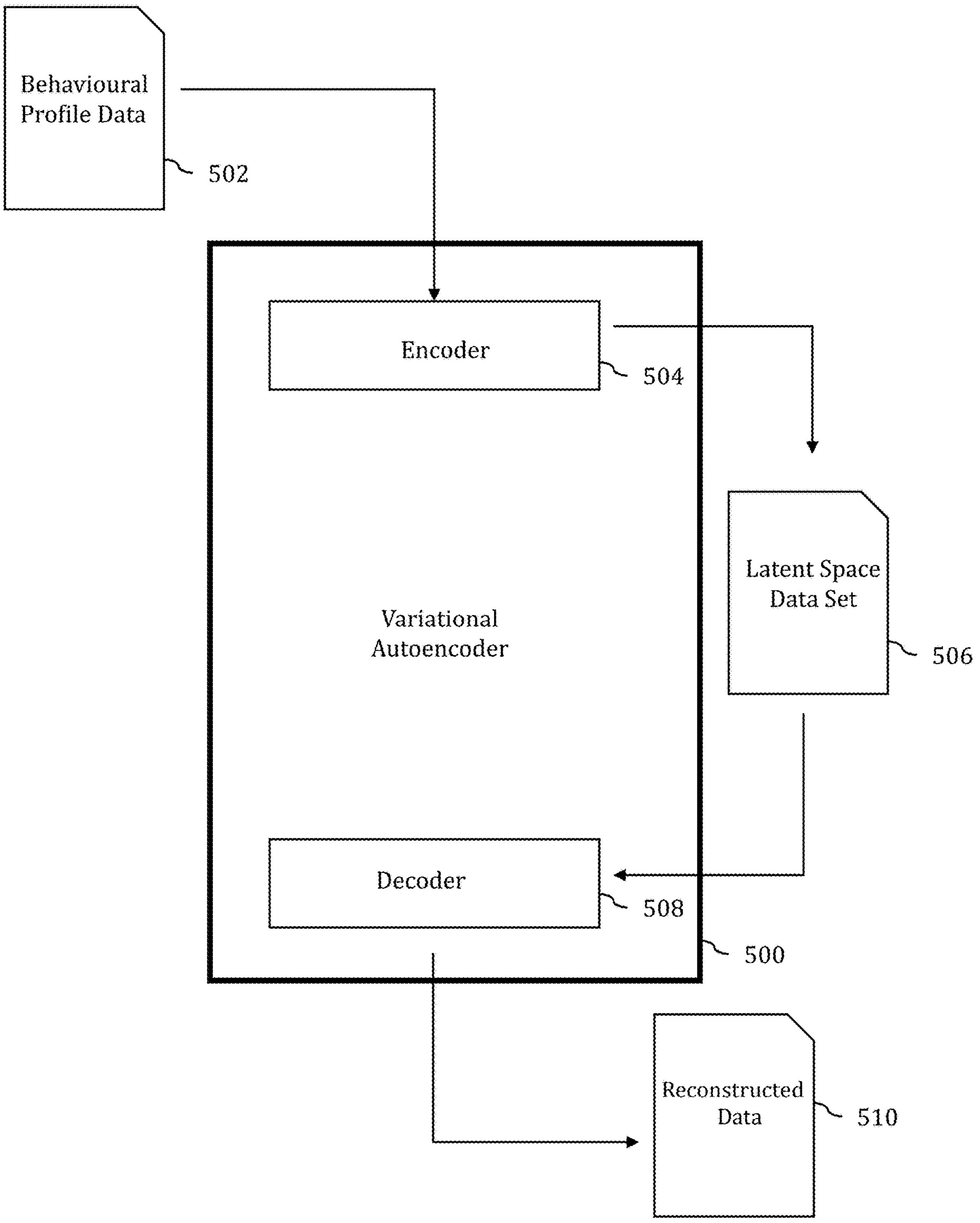
FIG. 5 illustrates a variational autoencoder of a kind that is implemented within the machine learning model platform of FIG. 4.

FIG. 5 illustrates a variational autoencoder 500 of a kind that is implemented within machine learning model platform 400 of FIG. 4.

As shown in FIG. 5, variational autoencoder 500 includes encoder 504 and decoder 508. Encoder 504 is configured for implementing the step of generating or encoding a latent space data set (i.e. vector or encoded data set) 506 based on behavioral profile data 502 that is provided as input data to variational autoencoder 500. Decoder 508 is configured for subsequently generating a reconstructed data set 510 based on the encoded latent space data set 506.

Encoder 504 is configured to receive as input data, behavioral profile data 502 (that has been extracted and/or aggregated from data messages received from remote entities—for example, a described in connection with FIG. 2), and to generate based on behavioral profile data 502, a latent space data set 506. In an embodiment, encoder 704 is configured such that (i) the dimensionality of latent space data set 506 is lower that the dimensionality of behavioral profile data 502 that is provided as input, or alternately (ii) the dimensionality of latent space data set 506 is the same as or higher than the dimensionality of behavioral profile data 502 that is provided as input.

Decoder 508 is configured to receive as input data, a latent space data set that has been generated by encoder 504, and to decode the received latent space data set to generate a reconstructed data set 510. In an embodiment, decoder 508 is configured such that (i) a dimensionality of the reconstructed data set 510 is higher than a dimensionality of the latent space data set 506 that is received as input data at decoder 508, or alternately (ii) a dimensionality of the reconstructed data set 510 is lower than or the same as a dimensionality of the latent space data set collated or 506 that is received as input data at decoder 508.

Decoder 508 may be utilized for receiving as input data, latent space data set 506, that has been generated based on behavioral profile data 502, and for decoding the latent space data set 506 for generating as output, a reconstructed data set 510.

In an embodiment of the invention, variational autoencoder 500 may be trained or configured, by iteratively training or configuring the encoder 504 and/or decoder 508 based on input data (for example, input data comprising behavioral profile data that has been extracted and stored by data aggregation platform 204)—wherein encoder 504 and decoder 508 are iteratively trained or configured until a measured reconstruction loss ($L_{rec}$) associated with variational autoencoder 500 (i.e. arising out of the functioning of said encoder 504 and decoder 508) is less than or equal to a predefined reconstruction loss threshold or value. For the purposes of the invention, reconstruction loss $L_{rec}$ shall be understood to mean a measured or quantifiable difference between (i) the data that is provided as input to encoder 504 and that is used to generate or encode a latent space data set 506, and (ii) the reconstructed data that is generated as output from decoder 508 based on the latent space data set 506.

In an embodiment, variational autoencoder 500 may be iteratively trained based on training data comprising behavioral profile data that has been extracted from data messages received from remote entities that are known or that have been identified as being legitimate entities.

In a particular embodiment, variational autoencoder 500 is trained based on behavioral profile data extracted from data messages received from a specific gateway device or gateway server—and the trained variational autoencoder 500 is associated with the specific gateway device or gateway server. In this embodiment, the trained variational autoencoder 500 is subsequently used to (i) analyze real time behavior of remote entities that send data messages to the specific gateway device or gateway server that has been used as a source of training data that has been used for training/configuration of variational autoencoder 500, and (ii) determine whether real time behavior of such remote entity is normal/indicative of said remote entity being a legitimate entity, or anomalous and therefore indicative of said remote entity being a malicious entity.

Figure 7:
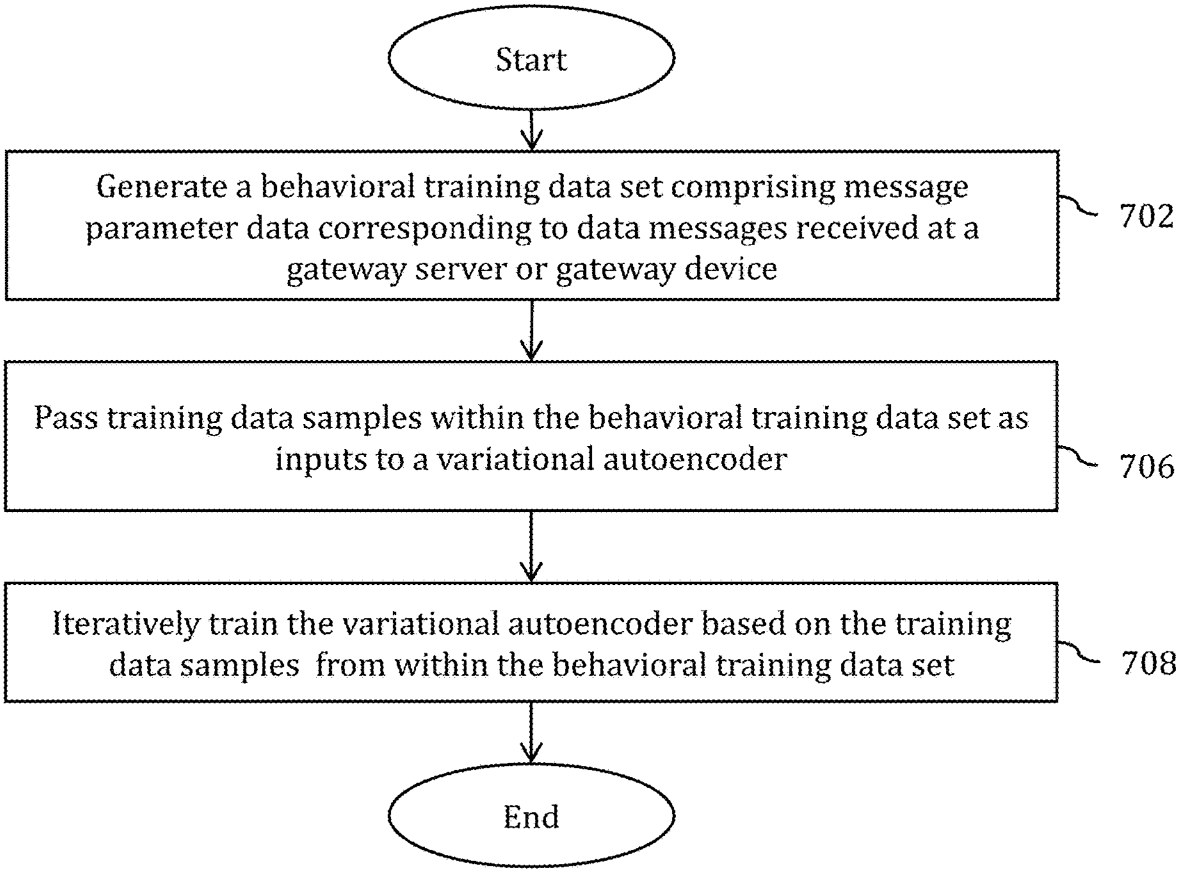
FIG. 7 is a flowchart illustrating a method of training the variational autoencoder of FIG. 5.

Moving to FIG. 7, the cited figure is a flowchart illustrating a method of training the variational autoencoder 500 of FIG. 5.

Step 702 comprises generating a behavioral training data set comprising message parameter data extracted from or corresponding to data messages received from one or more remote entities at a gateway server or gateway device. In an embodiment, the data messages from which message parameter data is extracted for inclusion within the behavioral training data set comprises data messages received from remote entities that have been identified or confirmed as legitimate entities or as non-malicious entities. In an embodiment, the gateway server or gateway device may comprise a gateway server 202 of a kind illustrated in FIG. 2.

The message parameter data within the behavioral training data set may include any data that represents network communication behavior of an originating remote entity (i.e. a remote entity from which the data message originated) and that is capable of being identified or parsed from data messages received from the remote entity. The message parameter data may include any or all of the following message parameter data: request length, response length, http request status code, response time, authorization latency, and a target URL identified in a data message. In an embodiment, the message parameter data is aggregated corresponding to each distinct IP address from which data messages are received at the gateway server or gateway device, to build to a behavioral profile of the remote entity that is using that IP address. Further said message parameter data corresponding to a distinct IP address may be aggregated across different time intervals to build a general behavioral profile of a particular remote entity.

Step 704 comprises passing training data samples from within the behavioral training data set, as inputs to variational autoencoder 500.

At step 706, variational autoencoder 500 is iteratively trained/configured based on the training data samples from within the behavioral training data set. In an embodiment, of step 706, encoder 504 and decoder 508 within variational autoencoder 500 are iteratively trained or configured based on the training data samples until a measured reconstruction loss ($L_{rec}$) associated with variational autoencoder 500 (i.e. arising out of the functioning of said encoder 504 and decoder 508) is less than or equal to a predefined reconstruction loss threshold or value.

Figure 6:
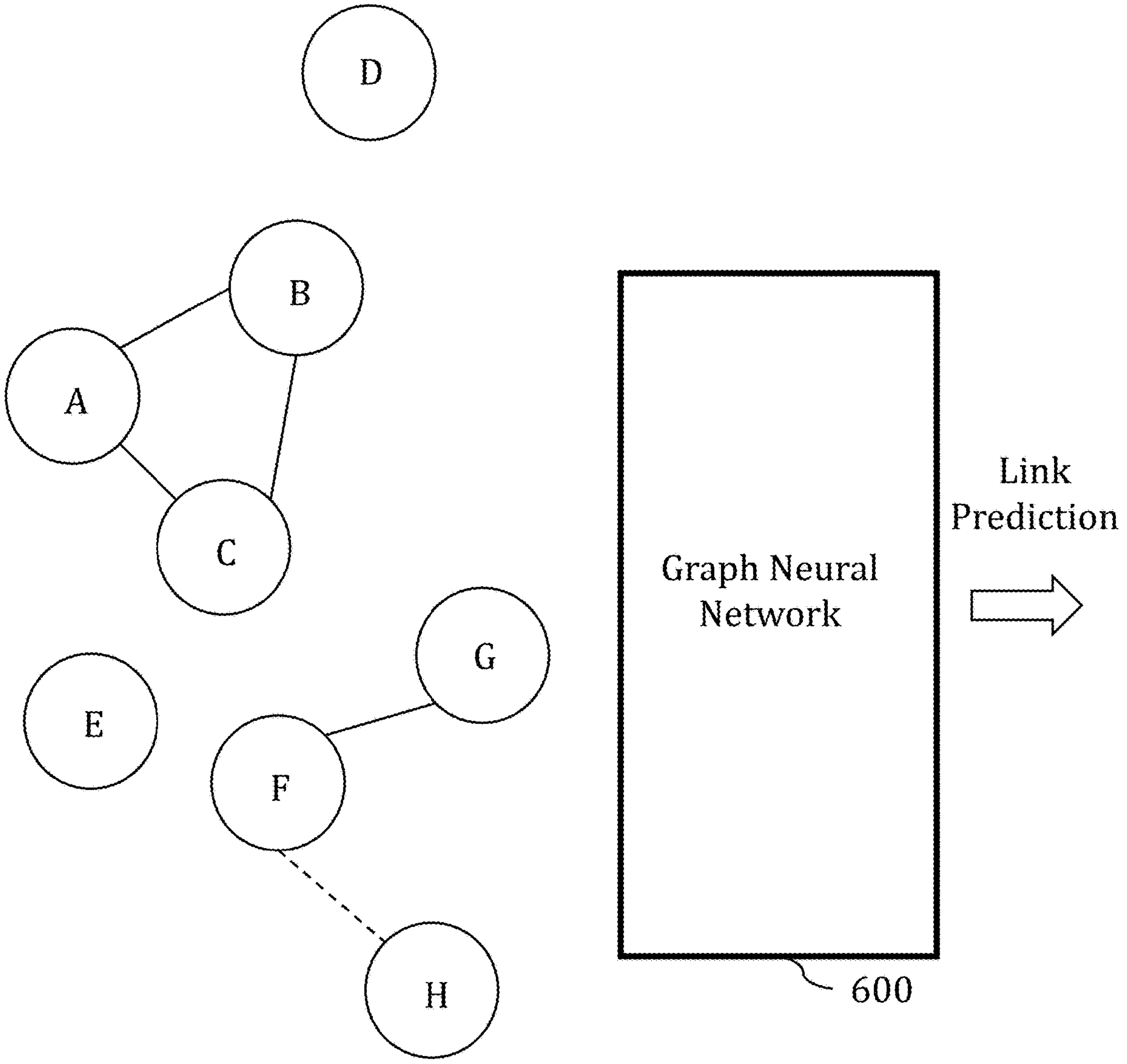
FIG. 6 illustrates a graph neural network of a kind that is implemented within the machine learning model platform of FIG. 4.

FIG. 6 illustrates a graph neural network 600 of a kind that is implemented within the machine learning model platform of FIG. 4. In an embodiment of the invention, graph neural network 600 is a graph convolutional network. In another embodiment, graph neural network 600 is a deep graph convolutional neural network. Graph neural network 600 is a processor implemented neural network configured to (i) receive as input, data representing a graph data structure comprising a plurality of nodes, and one or more edges (said edges representing connections between nodes), and (ii)

generate as output, prediction(s) as to whether links/connections exist between unconnected nodes within the graph data structure.

In the illustration of FIG. 6, an exemplary graph data structure comprises nodes A to H, wherein nodes A and B, nodes B and C, and nodes F and G are known to be connected and therefore have edges representing connections therebetween. Graph neural network 600 is configured in accordance with the present invention to predict whether links or connections exist between any unconnected node pairs with the graph data structure. For example, upon receiving the graph data structure as an input, graph neural network 600 may predict a link or connection between nodes F and H. The predicted links that are received as an output from graph neural network 600 may be used to update data records in which information corresponding to the individual nodes are stored—wherein the update to the data records comprises an update recording the predicted link(s) between nodes that were previously not known to be linked or connected.

In an embodiment of the invention, graph neural network 600 is configured to implement link prediction based on implementation of a SEAL framework (i.e. learning from Subgraphs, Embeddings, and Attributes for Link prediction). The SEAL framework involves using sub-graphs, attributes and embedding features of the graph. More specifically, the SEAL Framework relies on extracting sub-graphs of related nodes and learning the features of these sub-graphs via graph neural network 600. The learned model is thereafter used for link prediction between nodes within a sub-graph. The process of the SEAL framework is implemented in three steps namely:

1. Sub-graph Extraction, and Positive and Negative Link Sampling for training data.
2. Node feature vector construction for each sub-graph.
3. Training the graph neural network based on the training data.

Implementing the SEAL framework for a graph data structure comprises extracting from the graph data structure, its h-hop enclosing subgraph(s) A and building a node information matrix X (containing structural node labels, latent embeddings, and explicit attributes of nodes). Thereafter, inputs (A, X) are provided to the graph neural network 600 to classify link existence between nodes, so that the graph neural network can learn from both graph structure features (from A) and latent/explicit features (from X) simultaneously for link prediction. Once trained based on the data defining a graph data structure, graph neural network 600 can be used to predict the existence of links (or to predict non-links) between pairs of nodes within the graph data structure.

Figure 8:
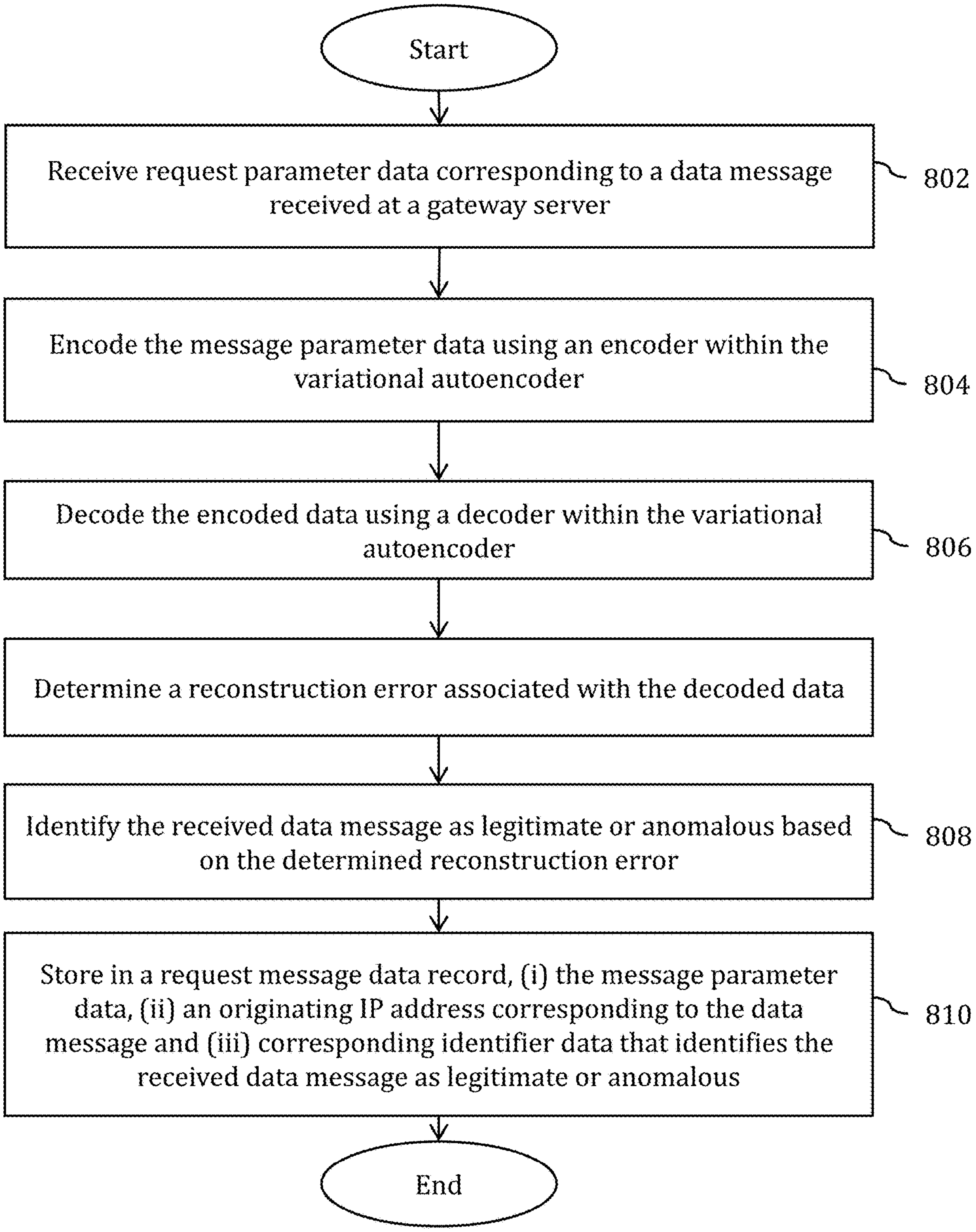
FIG. 8 is a flowchart illustrating a method of determining whether a data message received from a remote entity is legitimate or anomalous.

FIG. 8 is a flowchart illustrating a method of determining whether a data message received from a remote entity is legitimate or anomalous. The method of FIG. 8 is implemented at machine learning model platform 302, 400. In an embodiment, the method of FIG. 8 is implemented at machine learning model platform 302, 400 by variational autoencoder 500, and in a more particular embodiment, by a variational autoencoder 500 that has been trained in accordance with the method of FIG. 7.

Step 802 comprises receiving request parameter data corresponding to a data message that has been received at a gateway server. In an embodiment, the request parameter data is parsed or extracted from the data message received at the request gateway. The request parameter data may include data representing one or more of request length, response length, http request status code, response time, and authorization latency associated with the data message, and/or a target URL identified in or associated with a data message.

Step 804 comprises encoding the message parameter data using an encoder within the variational autoencoder. The message parameter data may be encoded by the encoder to generate a latent space data set.

Step 806 comprises decoding the encoded data (i.e. the generated latent space data set) using a decoder within the variational autoencoder. The decoder may decode the generated latent space data set and may output reconstructed message parameter data.

Step 808 comprises determining a reconstruction error associated with the reconstructed message parameter data. In an embodiment, the reconstruction error comprises a determined difference or distance between the message parameter data received at step 802 and the reconstructed message parameter data that is output at step 806.

Step 810 comprises identifying the data message that has been received at the gateway server (i.e. the data message from which the message parameter data has been extracted) as legitimate or anomalous based on the determined reconstruction error. In an embodiment, the data message is identified as (i) legitimate, if the determined reconstruction error is less than, or is less than or equal to, a predefined threshold value, or (ii) anomalous, if the determined reconstruction error is greater than, or is greater than or equal to, a predefined threshold value.

Step 812 comprises storing in an request message data record: (i) the message parameter data, (ii) an originating IP address corresponding to the data message from which the message parameter data has been extracted and (iii) a corresponding label or identifier data that identifies the received data message or the originating IP address as either legitimate or anomalous, wherein the label or identifier data is determined based on the identification at step 810.

In an embodiment of the method of FIG. 8, step 812 may be supplemented by, or may alternatively be substituted by a step of responding to a determination that the data message that has been received at the gateway server (i.e. the data message from which the message parameter data has been extracted) is anomalous, by initiating a processor implemented instance of a threat handling process flow. The threat handling process flow may comprise any situation appropriate process flow, including quarantining of the received data message, or rejection of a data request or a service request represented within the received data message, or any other predefined security response.

Figure 9:
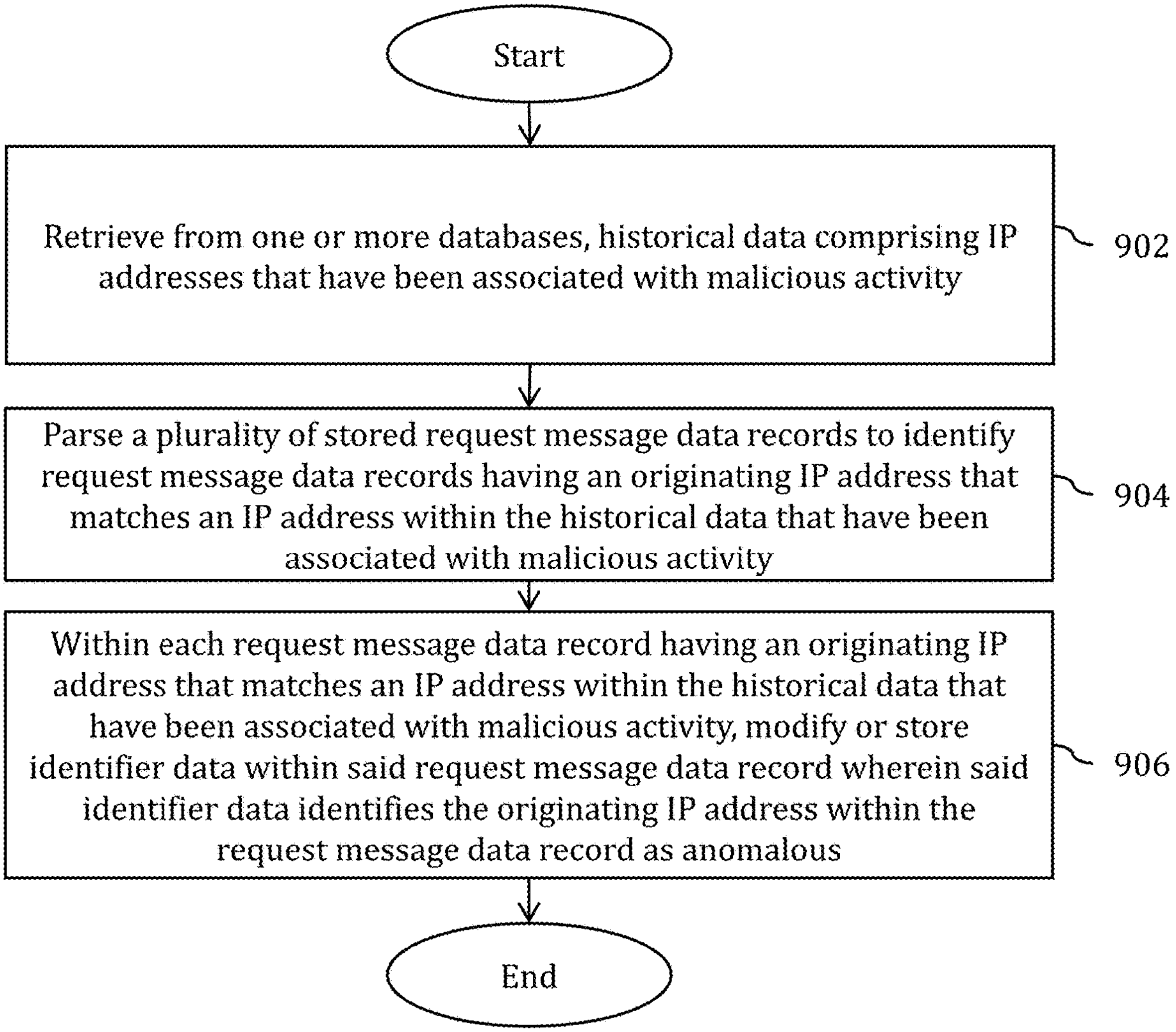
FIG. 9 is a flowchart illustrating a first method of updating data records generated in accordance with the method of FIG. 8, based on historical data.

FIG. 9 is a flowchart illustrating a first method of updating data records generated in accordance with the method of FIG. 8, based on historical data. The method of FIG. 9 seeks to improve identification of legitimate or anomalous remote entities and/or originating IP addresses, by relying on historical data from external databases. Examples of such historical data includes IP address blacklists, IP address whitelists, data parsed from social media feeds, data parsed from network traffic monitoring tools and/or data parsed from domain name server (DNS) data and domain registration data.

Step 902 comprises retrieving from one or more databases, historical data that identifies IP addresses that have been associated with malicious activity or anomalous activity.

Step 904 comprises parsing a plurality of stored request message data records (that have been generated and stored in accordance with the method of FIG. 8) to identify request message data records having an originating IP address that matches an IP address that has been associated with malicious/anomalous activity within the historical data.

At step 906, each request message data record having an originating IP address that matches an IP address that has been associated with malicious/anomalous activity within the historical data, is modified by modifying or storing a label or identifier data within said request message data record, such that the modified or stored label or identifier data identifies the originating IP address within said request message data record as anomalous or malicious.

By implementing the method of FIG. 9, the invention enables request message data records that have been generated based on the method of FIG. 8, to be supplemented with information on malicious/anomalous activity from external databases or data sources—thereby improving the identification of anomalous or malicious remote entities or originating IP addresses.

Figure 10:
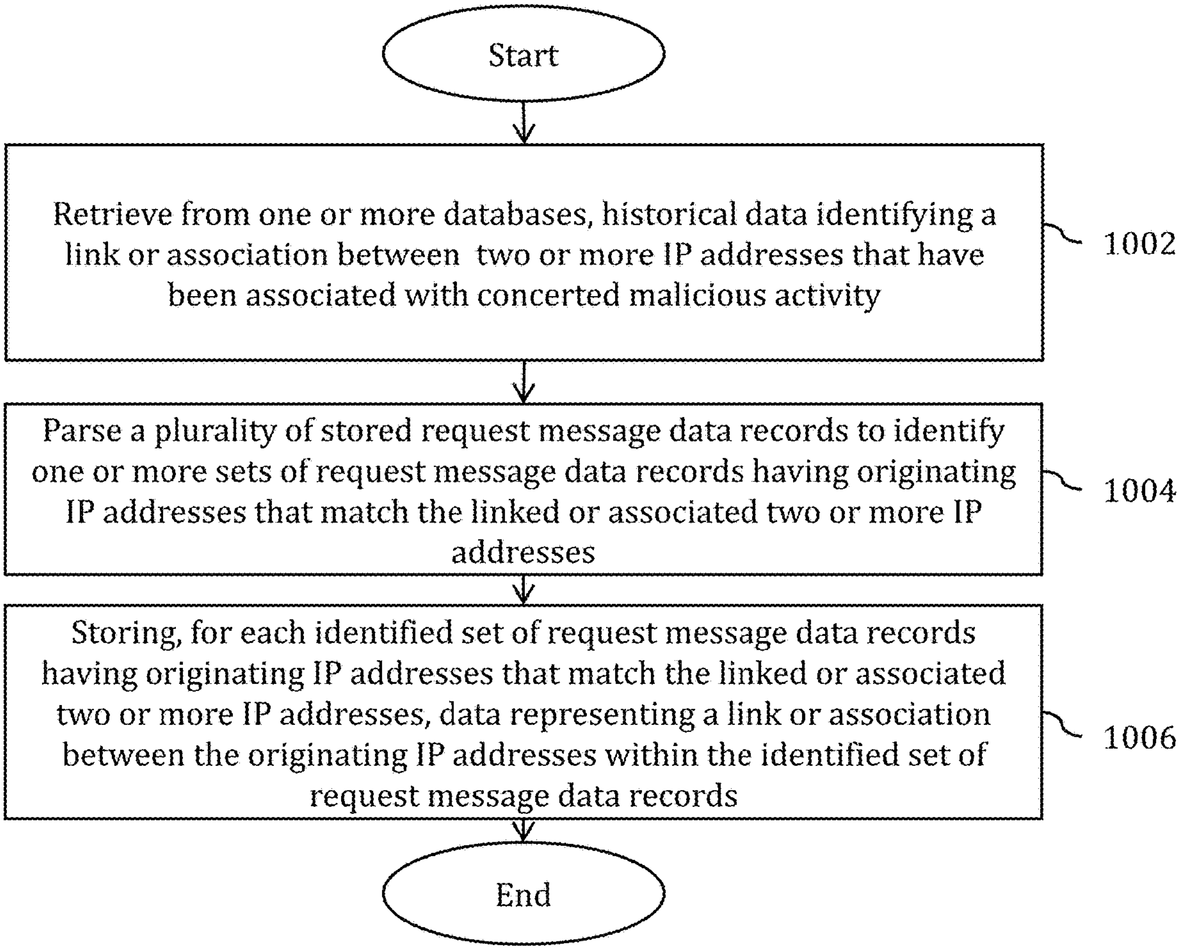
FIG. 10 is a flowchart illustrating a second method of updating data records generated in accordance with the method of FIG. 8, based on historical data.

FIG. 10 is a flowchart illustrating a second method of updating data records generated in accordance with the method of FIG. 8, based on historical data.

The method of FIG. 10 seeks to improve identification of anomalous or malicious remote entities and/or originating IP addresses, by relying on historical data from external databases to link or associate two or more remote entities/originating IP addresses that have been found to be concertedly involved in malicious or anomalous behavior—for example, two or more remote entities that are involved in a distributed denial of service (DDOS) attack. Examples of historical data that can be used to obtain the necessary information concerning remote entities acting concertedly, includes IP address blacklists, IP address whitelists, data parsed from social media feeds, data parsed from network traffic monitoring tools and/or data parsed from domain name server (DNS) data and domain registration data.

Step 1002 comprises retrieving from one or more databases, historical data identifying a link or association between two or more IP addresses that have been associated with concerted malicious or anomalous activity.

Step 1004 comprises parsing a plurality of stored request message data records (that have been generated and stored in accordance with the method of FIG. 8) to identify one or more sets of request message data records having originating IP addresses that match the linked or associated two or more IP addresses that have been associated with concerted malicious or anomalous activity.

Step 1006 involves storing, for each identified set of request message data records having originating IP addresses that match the linked or associated two or more IP addresses, data representing a link or association between the originating IP addresses within the identified set of request message data records.

In an embodiment of the method of FIG. 10, either of step 1004 or step 1006 is followed by an additional step, wherein in response to determination of a link or association between (i) a first originating IP address (within a first stored message data record) that has been identified as anomalous, and (ii) a second originating IP address (within a second stored message data record) that has been identified as legitimate—the identifier data within the second stored message data record is modified to identify the second originating IP address as anomalous.

By implementing the method of FIG. 10, the invention enables request message data records that have been generated based on the method of FIG. 8, to be supplemented with information that records links or associations between two or remote entities/originating IP addresses that has been found to be involved in concerted malicious/anomalous activity—which information can further improve identification of anomalous or malicious remote entities or originating IP addresses.

Figure 11:
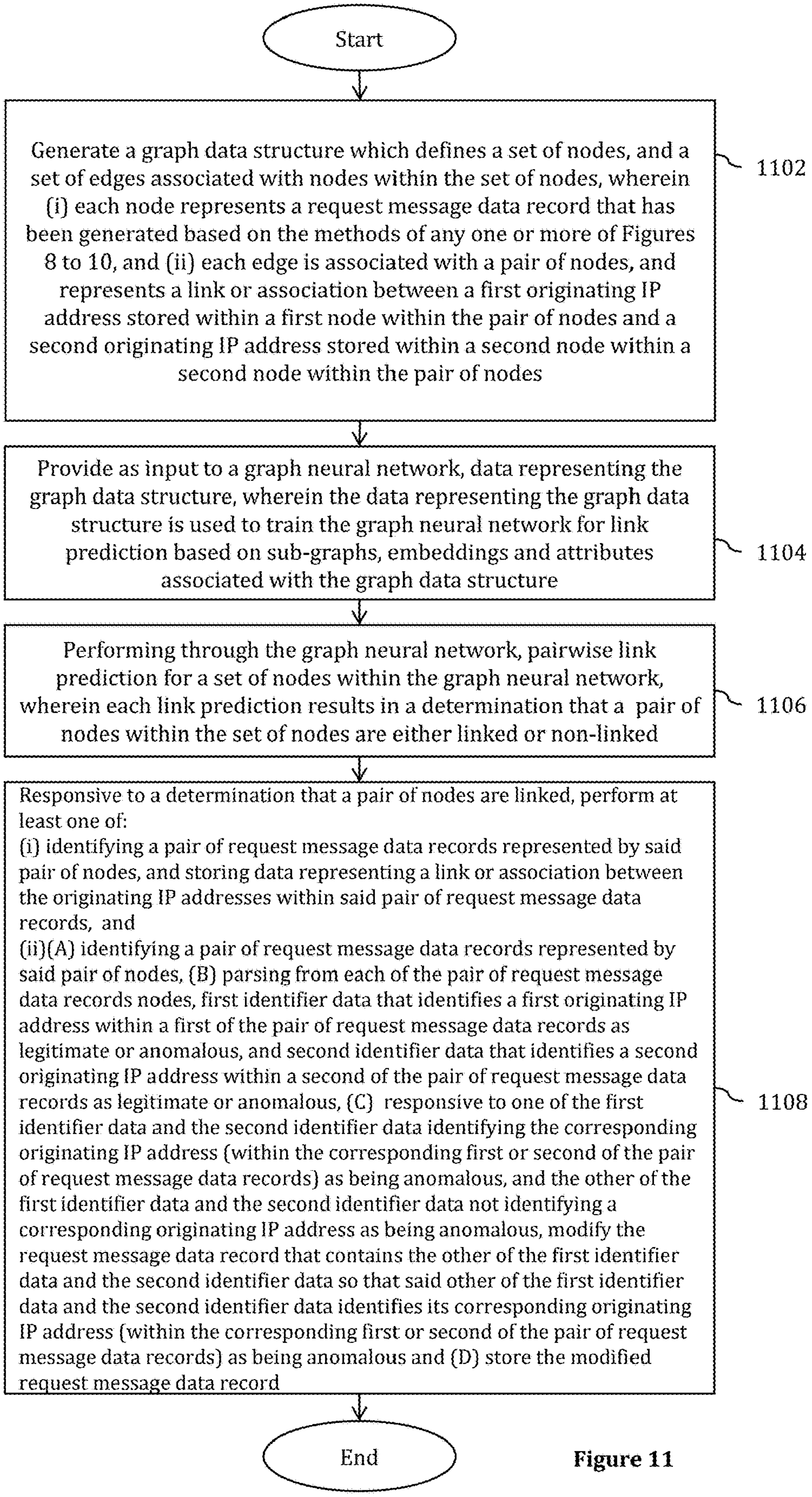
FIG. 11 is a flowchart illustrating a third method of updating data records generated in accordance with the method of FIG. 8, that is performed using a graph neural network within the machine learning model platform of the present invention.

FIG. 11 is a flowchart illustrating a third method of updating data records generated in accordance with the method of FIG. 8, that is performed using a graph neural network 404, 600, within a machine learning model platform 400 of the present invention.

Step 1102 comprises generating or retrieving a graph data structure which defines a set of nodes, and a set of edges associated with nodes within the set of nodes, wherein (i) each node represents a request message data record that has been generated based on the methods of any one or more of FIGS. 8 to 10, or represents the originating IP address stored within said request message data record and (ii) each edge is associated with a pair of nodes, and represents a link or association between a first originating IP address stored within a first request message data record corresponding to a first node within the pair of nodes, and a second originating IP address stored within a second request message data record corresponding to a second node within the pair of nodes. The link or association that is represented by each edge, may in an embodiment comprise a link or association that has been identified and stored through the method of FIG. 10.

Step 1104 comprises providing as input to a graph neural network 404, 600, data representing the graph data structure that has been generated or retrieved at step 1102, wherein data representing the graph data structure is used to train graph neural network 404, 600 for link prediction between nodes. In an embodiment of the invention, graph neural network 404, 600 is trained for link prediction based on implementation of a SEAL framework (i.e. learning from Subgraphs, Embeddings, and Attributes for Link prediction). In a more particular embodiment, training graph neural network 404, 600 comprises using sub-graphs, attributes and embedding features of the input graph data structure. In an even more specific embodiment, training of graph neural network 404, 600 relies on extracting sub-graphs of related nodes and learning the features of these sub-graphs via graph neural network 404, 600. The learned model is thereafter used for link prediction between nodes within a sub-graph of the graph data structure. In an embodiment, the process of training graph neural network 404, 600 is implemented by the following three steps:

1. Sub-graph extraction, and positive and negative link sampling for training data.
2. Node feature vector construction for each sub-graph.
3. Training the graph neural network based on the training data.

Subsequent to training graph neural network 404, 600 at step 1104, step 1106 comprises performing through the trained graph neural network 404, 600, pairwise link prediction for a set of nodes within the graph neural network, wherein each link prediction results in a determination that a pair of nodes within the set of nodes are either linked or non-linked. In an embodiment, the pairwise link prediction is performed for one or more pairs of nodes within the graph data structure, wherein the nodes within each pair of such nodes are not connected by an edge.

Step 1108 comprises responding to a determination (at step 1106) that a pair of nodes are linked, by performing at least one of:

(i) identifying a pair of request message data records represented by said pair of nodes, and storing data representing a link or association between the originating IP addresses within said pair of request message data records, and (ii) (A) identifying a pair of request message data records represented by said pair of nodes, (B) parsing from each of the pair of request message data records nodes, first identifier data that identifies a first originating IP address within a first of the pair of request message data records as legitimate or anomalous, and second identifier data that identifies a second originating IP address within a second of the pair of request message data records as legitimate or anomalous, (C) responsive to one of the first identifier data and the second identifier data identifying the corresponding originating IP address (within the corresponding first or second of the pair of request message data records) as being anomalous, and the other of the first identifier data and the second identifier data not identifying a corresponding originating IP address as being anomalous, modifying the request message data record that contains the other of the first identifier data and the second identifier data so that said other of the first identifier data and the second identifier data identifies its corresponding originating IP address (within the corresponding first or second of the pair of request message data records) as being anomalous and (D) storing the modified request message data record.

Figure 12:
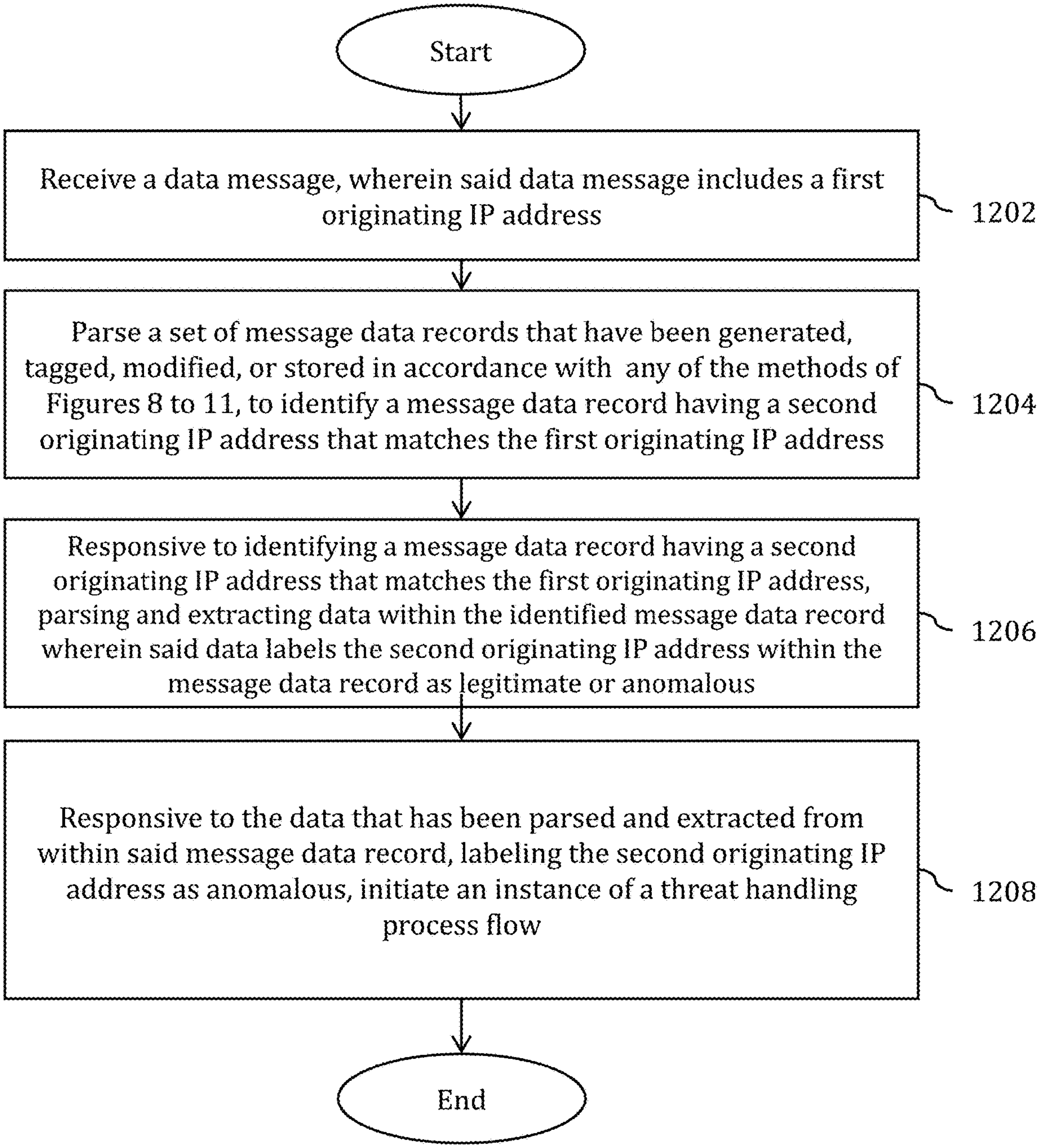
FIG. 12 is a flowchart illustrating a method of anomaly handling in accordance with the teachings of the present invention.

FIG. 12 is a flowchart illustrating a method of anomaly handling in accordance with the teachings of the present invention.

Step 1202 comprises receiving a data message, wherein said data message includes a first originating IP address. The data message may be received from a remote entity and may in an embodiment be received at a gateway server 2022, 2024, 2026.

Step 1204 comprises parsing a set of message data records that have been generated, tagged, modified, or stored in accordance with any of the methods of FIGS. 8 to 11, to identify a message data record having a second originating IP address that matches the first originating IP address.

Step 1206 comprises responding to identification of a message data record having a second originating IP address that matches the first originating IP address, by parsing and/or extracting from the identified message data record, data identifying the originating IP address within the identified message data record (i.e. the second originating IP address) as legitimate or anomalous. In an embodiment parsing and/or extracting data from the identified message data record comprises parsing a tag or data field within said identified message data record wherein said tag or data field labels the originating IP address within the identified message data record (i.e. the second originating IP address) as either legitimate or anomalous, and extracting the data from said tag or data field.

Step 1208 comprises responding to a determination that the extracted data within the identified message data record labels the second originating IP address within said second message data record as anomalous, by transmitting a data message initiating a processor implemented instance of a threat handling process flow. The threat handling process flow may comprise any situation appropriate process flow, including quarantining of the received data message, or rejection of a data request or a service request represented within the received data message, or any other predefined security response.

Figure 13:
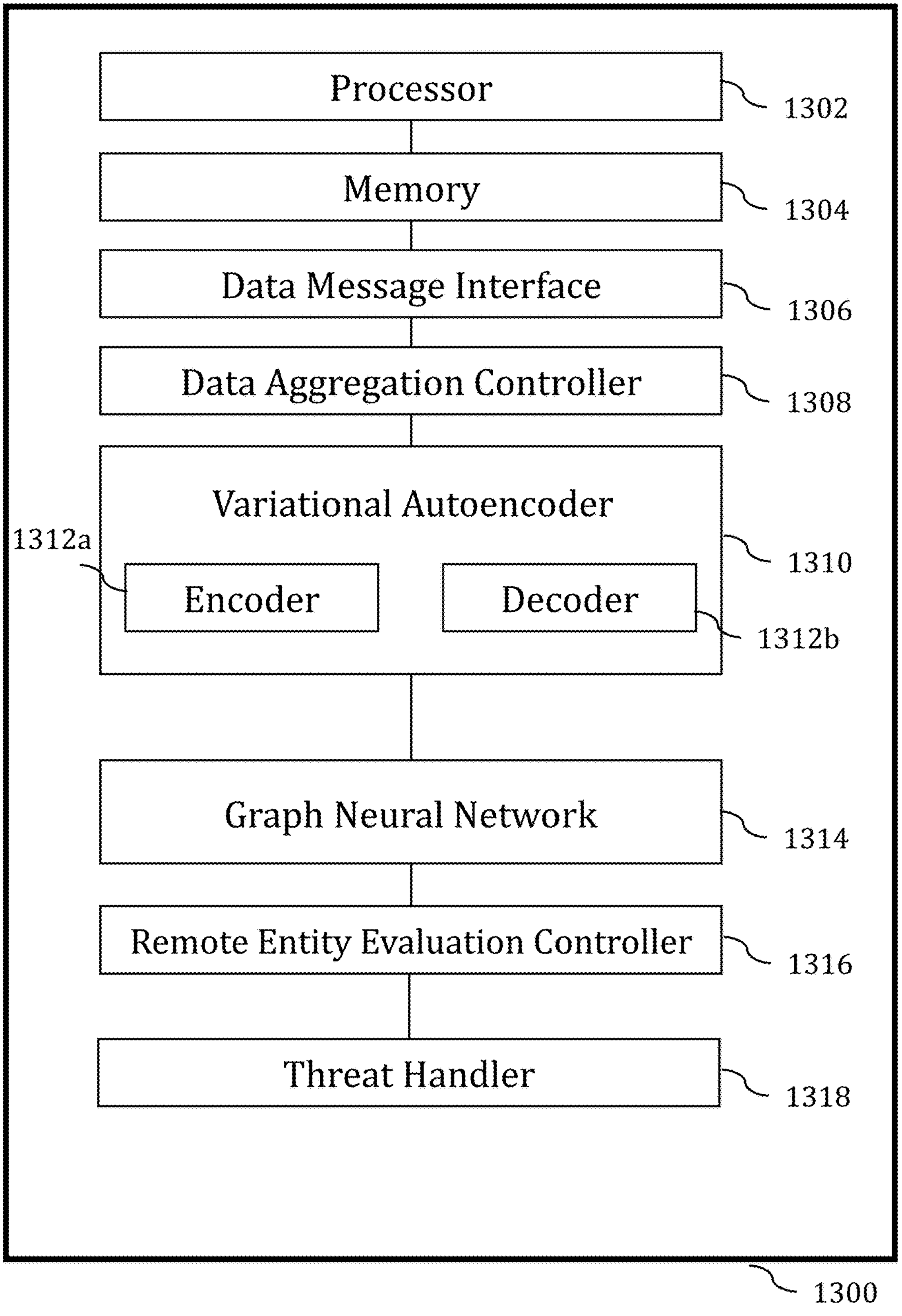
FIG. 13 illustrates an exemplary system configured to implement the methods of the present invention.

FIG. 13 illustrates an exemplary system 1300 configured to implement the methods of the present invention. In an embodiment system 1300 may be configured to implement the functionality of any one or more of gateway infrastructure 202, data aggregation platform 204 and/or machine learning model platform 302, 400 as described hereinabove.

System 1300 comprises a processor 1302 and a memory 1304.

Additionally, system 1300 comprises data message interface 1306. Data message interface 1306 is a processor implemented interface that is configured for system 1300 to receive data messages in accordance with any of step 702 (of FIG. 7), step 802 (of FIG. 8), and step 1202 (of FIG. 12), as described hereinabove.

System 1300 includes a processor implemented data aggregation controller 1308 that is configured to parse and extract behavioral profile data based on data messages that have been transmitted to data message interface 1306 from one or more remote entities. In an embodiment, data aggregation controller 1308 is configured to generate a behavioral training data set in accordance with step 702 (of FIG. 7) and/or to parse and extract data message parameter data in accordance with step 802 (of FIG. 8) as described hereinabove.

System 1300 includes a processor implemented variational autoencoder 1310, comprising a processor implemented encoder 1312*a* and a processor implemented decoder 1312*b*. Each of variational autoencoder 1310, encoder 1312*a* and decoder 1312*b* may be configured in accordance with the configuration and attributes for a variational autoencoder, and corresponding encoder and decoder, as described above in connection with FIGS. 4, 5, 7, 8, and 12 hereinabove.

System 1300 also includes a processor implemented graph neural network 1314. Graph neural network 1300 may be configured as described above in connection with FIGS. 6, 10, and 11 hereinabove.

System 1300 additionally includes a processor implemented remote entity evaluation controller 1416 that is configured to evaluate and determine whether a remote entity from which a data message has been received is a legitimate or malicious entity. In an embodiment, remote entity evaluation controller 1416 is configured to perform step 1206 of FIG. 12, as described hereinabove.

System 1300 additionally includes a processor implemented threat handler 1418 that is configured to initiate or implement an instance of a threat handling process flow perform—for example, in the manner described above at step 1208 of the method of FIG. 12.

The invention provides a computer implemented method for detection of anomalous activity by a remote entity over a communication network. The method comprises implementing at a processor, the steps of (i) receiving a data message from a remote entity, wherein said first data message includes a first originating internet protocol (IP) address, (ii) identifying a data message record from among a set of stored message data records, wherein the identified data message record includes a second originating IP address, and wherein the second originating IP address matches the first originating IP address, (iii) parsing a data field within the identified data message record and extracting from the parsed data field, data that identifies the second originating IP address as legitimate or anomalous, and (iv) responding to determining based on the extracted data, that the second originating IP address is anomalous, initiating a processor implemented instance of a threat handling process flow.

In performing the method, (i) at least one stored message data record within the set of stored message data records, includes identifier data that identifies an originating IP address within said stored message data record as either legitimate or anomalous, and (ii) the identifier data within the stored message data record has been generated by performing the steps of (a) receiving request parameter data corresponding to a data message, (b) encoding the message parameter data at an encoder within a variational autoencoder, (c) decoding the encoded data using a decoder within the variational autoencoder, (d) determining a reconstruction error associated with output from the decoder, and (e) generating identifier data (i) that identifies the originating IP address within said stored message data record as legitimate when the reconstruction error is less than a predefined error threshold, or (ii) that identifies the originating IP address within said stored message data record as anomalous when the reconstruction error is more than a predefined error threshold.

In an embodiment of the method, a state of the identifier data within the stored message data record has been modified by performing the further steps of (i) retrieving from a database, historical data identifying IP addresses that have been associated with anomalous activity, and (ii) responding to a determination that an IP address identified by the historical data as having been associated with anomalous activity matches the originating IP address within said stored message data record, by modifying the identifier data within the stored message data record to identify the originating IP address within said stored message data record as anomalous.

In another embodiment of the method, a state of the identifier data within the stored message data record has been modified by performing the further steps of (i) identifying a link between a first originating IP address within a first stored message data record, and a second originating IP address within a second stored message data record, and (ii) in response to determining that the first originating IP address has been identified as anomalous, and that the second originating IP address has been identified as legitimate, modifying identifier data within the second stored message data record to identify the second originating IP address as anomalous.

In a more particular embodiment of the method, identifying the link between the first originating IP address within the first stored message data record, and the second originating IP address within the second stored message data record comprises (i) generating a graph data structure that defines a set of nodes and a set of edges, wherein each node represents a stored message data record within the set of stored message data records, and wherein each edge represents a link between two originating IP address, each of the two originating IP addresses stored within a corresponding stored message data record within the set of stored message data records, (ii) providing data representing the graph data structure as input to a graph neural network, and (iii) receiving from the graph neural network, output identifying the link between the first originating IP address within the first stored message data record, and the second originating IP address within the second stored message data record.

In a yet more particular embodiment of the method, the graph neural network is trained for identifying links between originating IP addresses by (i) providing data representing the graph data structure as input to a graph neural network, (ii) extracting sub-graphs of related nodes within the graph neural network, and (iii) learning the features of the extracted sub-graphs within the graph neural network.

The invention also provides a system for detection of anomalous activity by a remote entity over a communication network. The system comprises at least a processor implemented variational autoencoder and a processor implemented graph neural network, wherein the system is configured to perform the steps of (i) receiving a data message from a remote entity, wherein said first data message includes a first originating internet protocol (IP) address, (ii) identifying a data message record from among a set of stored message data records, wherein the identified data message record includes a second originating IP address, and wherein the second originating IP address matches the first originating IP address, (iii) parsing a data field within the identified data message record and extracting from the parsed data field, data that identifies the second originating IP address as legitimate or anomalous, and (iv) responding to determining based on the extracted data, that the second originating IP address is anomalous, initiating a processor implemented instance of a threat handling process flow.

In an embodiment of the above system (i) at least one stored message data record within the set of stored message data records, includes identifier data that identifies an originating IP address within said stored message data record as either legitimate or anomalous, and (ii) the identifier data within the stored message data record has been generated by performing the steps of (a) receiving request parameter data corresponding to a data message, (b) encoding the message parameter data at an encoder within a variational autoencoder, (c) decoding the encoded data using a decoder within the variational autoencoder, (d) determining a reconstruction error associated with output from the decoder, and (e) generating identifier data (i) that identifies the originating IP address within said stored message data record as legitimate when the reconstruction error is less than a predefined error threshold, or (ii) that identifies the originating IP address within said stored message data record as anomalous when the reconstruction error is more than a predefined error threshold.

In an embodiment of the system, a state of the identifier data within the stored message data record has been modified by performing the further steps of (i) retrieving from a database, historical data identifying IP addresses that have been associated with anomalous activity, and (ii) responding to a determination that an IP address identified by the historical data as having been associated with anomalous activity matches the originating IP address within said stored message data record, by modifying the identifier data within the stored message data record to identify the originating IP address within said stored message data record as anomalous.

In another embodiment of the system, a state of the identifier data within the stored message data record has been modified by performing the further steps of (i) identifying a link between a first originating IP address within a first stored message data record, and a second originating IP address within a second stored message data record, and (ii) in response to determining that the first originating IP address has been identified as anomalous, and that the second originating IP address has been identified as legitimate, modifying identifier data within the second stored message data record to identify the second originating IP address as anomalous.

In a more particular embodiment of the system, identifying the link between the first originating IP address within the first stored message data record, and the second originating IP address within the second stored message data record comprises (i) generating a graph data structure that defines a set of nodes and a set of edges, wherein each node represents a stored message data record within the set of stored message data records, and wherein each edge represents a link between two originating IP address, each of the two originating IP addresses stored within a corresponding stored message data record within the set of stored message data records, (ii) providing data representing the graph data structure as input to a graph neural network, and (iii) receiving from the graph neural network, output identifying the link between the first originating IP address within the first stored message data record, and the second originating IP address within the second stored message data record.

In a yet more particular embodiment of the system, the graph neural network is trained for identifying links between originating IP addresses by (i) providing data representing the graph data structure as input to a graph neural network, (ii) extracting sub-graphs of related nodes within the graph neural network, and (iii) learning the features of the extracted sub-graphs within the graph neural network.

The invention also provides a computer program product for detection of anomalous activity by a remote entity over a communication network. The computer program product comprises a non-transitory computer readable medium having a computer readable program code embodied therein, wherein the computer readable program code comprises instructions for performing at, at least one processor, the steps of (i) receiving a data message from a remote entity, wherein said first data message includes a first originating internet protocol (IP) address, (ii) identifying a data message record from among a set of stored message data records, wherein the identified data message record includes a second originating IP address, and wherein the second originating IP address matches the first originating IP address, (iii) parsing a data field within the identified data message record and extracting from the parsed data field, data that identifies the second originating IP address as legitimate or anomalous, and (iv) responding to determining based on the extracted data, that the second originating IP address is anomalous, initiating a processor implemented instance of a threat handling process flow.

In an embodiment of the above described computer program product (i) at least one stored message data record within the set of stored message data records, includes identifier data that identifies an originating IP address within said stored message data record as either legitimate or anomalous, and (ii) the identifier data within the stored message data record has been generated by performing the steps of (a) receiving request parameter data corresponding to a data message, (b) encoding the message parameter data at an encoder within a variational autoencoder, (c) decoding the encoded data using a decoder within the variational autoencoder, (d) determining a reconstruction error associated with output from the decoder, and (e) generating identifier data (i) that identifies the originating IP address within said stored message data record as legitimate when the reconstruction error is less than a predefined error threshold, or (ii) that identifies the originating IP address within said stored message data record as anomalous when the reconstruction error is more than a predefined error threshold.

Figure 14:
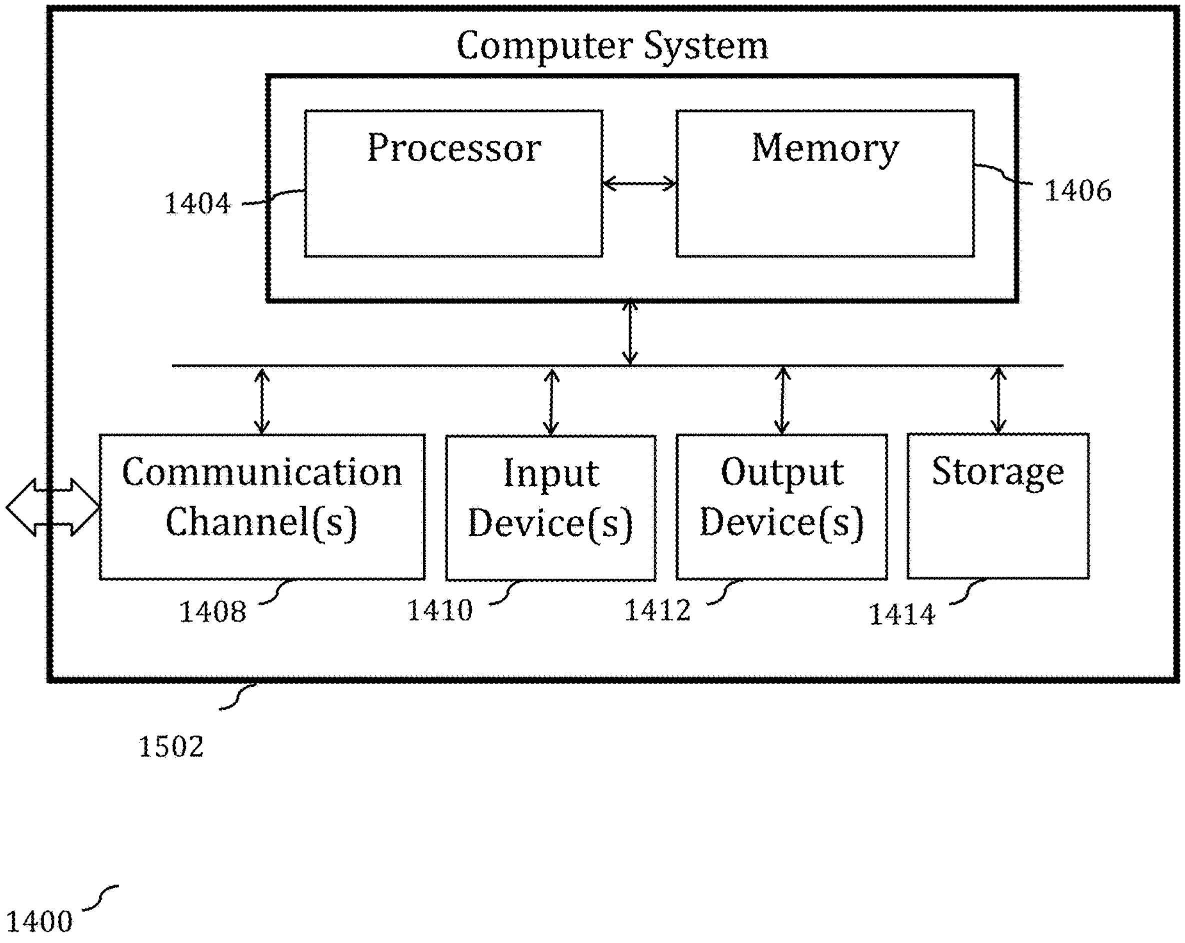
FIG. 14 illustrates an exemplary computer system according to which various embodiments of the present invention may be implemented.

FIG. 14 illustrates an exemplary computer system according to which various embodiments of the present invention may be implemented.

System 1400 includes computer system 1402 which in turn comprises one or more processors 1404 and at least one memory 1406. Processor 1404 is configured to execute program instructions—and may be a real processor or a virtual processor. It will be understood that computer system 1402 does not suggest any limitation as to scope of use or functionality of described embodiments. The computer system 1402 may include, but is not limited to, one or more of a general-purpose computer, a programmed microprocessor, a micro-controller, an integrated circuit, and other devices or arrangements of devices that are capable of implementing the steps that constitute the method of the present invention. Exemplary embodiments of a computer system 1402 in accordance with the present invention may include one or more servers, desktops, laptops, tablets, smart phones, mobile phones, mobile communication devices, phablets and personal digital assistants. In an embodiment of the present invention, the memory 1406 may store software for implementing various embodiments of the present invention. The computer system 1402 may have additional components. For example, the computer system 1402 may include one or more communication channels 1408, one or more input devices 1410, one or more output devices 1412, and storage 1414. An interconnection mechanism (not shown) such as a bus, controller, or network, interconnects the components of the computer system 1402. In various embodiments of the present invention, operating system software (not shown) provides an operating environment for various softwares executing in the computer system 1402 using a processor 1404, and manages different functionalities of the components of the computer system 1402.

The communication channel(s) 1408 allow communication over a communication medium to various other computing entities. The communication medium provides information such as program instructions, or other data in a communication media. The communication media includes, but is not limited to, wired or wireless or contactless methodologies implemented with an electrical, optical, RF, infrared, acoustic, microwave, Bluetooth or other transmission media.

The input device(s) 1410 may include, but is not limited to, a touch screen, a keyboard, mouse, pen, joystick, trackball, a voice device, a scanning device, or any another device that is capable of providing input to the computer system 1402. In an embodiment of the present invention, the input device(s) 1410 may be a sound card or similar device that accepts audio input in analog or digital form. The output device(s) 1412 may include, but not be limited to, a user interface on CRT, LCD, LED display, or any other display associated with any of servers, desktops, laptops, tablets, smart phones, mobile phones, mobile communication devices, phablets and personal digital assistants, printer, speaker, CD/DVD writer, or any other device that provides output from the computer system 1402.

The storage 1414 may include, but not be limited to, magnetic disks, magnetic tapes, CD-ROMs, CD-RWs, DVDs, any types of computer memory, magnetic stripes, smart cards, printed barcodes or any other transitory or non-transitory medium which can be used to store information and can be accessed by the computer system 1402. In various embodiments of the present invention, the storage 1414 may contain program instructions for implementing any of the described embodiments.

In an embodiment of the present invention, the computer system 1402 is part of a distributed network or a part of a set of available cloud resources.

The present invention may be implemented in numerous ways including as a system, a method, or a computer program product such as a computer readable storage medium or a computer network wherein programming instructions are communicated from a remote location.

The present invention may suitably be embodied as a computer program product for use with the computer system 1402. The method described herein is typically implemented as a computer program product, comprising a set of program instructions that is executed by the computer system 1402 or any other similar device. The set of program instructions may be a series of computer readable codes stored on a tangible medium, such as a computer readable storage medium (storage 1414), for example, diskette, CD-ROM, ROM, flash drives or hard disk, or transmittable to the computer system 1402, via a modem or other interface device, over either a tangible medium, including but not limited to optical or analogue communications channel(s) 1408. The implementation of the invention as a computer program product may be in an intangible form using wireless or contactless techniques, including but not limited to microwave, infrared, Bluetooth or other transmission techniques. These instructions can be preloaded into a system or recorded on a storage medium such as a CD-ROM, or made available for downloading over a network such as the Internet or a mobile telephone network. The series of computer readable instructions may embody all or part of the functionality previously described herein.

As a result of implementing the above teachings, the present invention provides reliable and accurate detection and handling of threats or malicious activity that have been initiated by malicious remote entities through network-based communications and/or transactions.

Various embodiments of the present disclosure provide multiple advantages and technical effects while addressing technical problems such as reliable and accurate detection and handling of threats or malicious activity initiated by malicious remote entities.

To that end, the various embodiments of the present disclosure provide an approach that reduces or eliminates the likelihood that in the event an IP address has been previously incorrectly tagged, appropriate protective action or security actions may fail to be taken in response to future communications received from such an incorrectly tagged IP address. Further, the invention also reduces or eliminates the likelihood of failing to address security threats arising from network communications or network messages received from malicious IP addresses that have for some reason not been previously tagged at all.

As a result, the invention reduces or eliminates network security threats posed by malicious remote entities and/or malicious IP addresses by improving detection and/or identification of such malicious remote entities and/or malicious IP addresses through the novel and inventive machine learning model platform(s) described above.

The present disclosure describes various specifically configured or specifically trained processor implemented machine-learning based models (including for example, specifically configured variational autoencoders and neural network systems) that are configured or trained to perform the methods of the present invention. Exemplary applications of the present invention have been described hereinabove in connection with FIG. 12 and the accompanying written description describing the method of FIG. 12.

While exemplary embodiments of the present invention are described and illustrated herein, it will be appreciated that they are merely illustrative. It will be understood by those skilled in the art that various modifications in form and detail may be made therein without departing from the scope of the invention as defined by the appended claims. Additionally, the invention illustratively disclose herein suitably may be practiced in the absence of any element which is not specifically disclosed herein—and in a particular embodiment that is specifically contemplated, the invention is intended to be practiced in the absence of any one or more element which are not specifically disclosed herein.

We claim:

1. A computer implemented method for detection of anomalous activity by a remote entity over a communication network, comprising implementing at a processor, the steps of: iteratively training a variational autoencoder, using a training data set comprising message parameter data extracted from data messages received from a plurality of remote entities that are identified as legitimate entities, the iterative training continuing until a measured reconstruction error associated with the variational autoencoder does not exceed a first reconstruction error threshold; receiving a first data message from a remote entity, wherein said first data message includes a first originating internet protocol (IP) address; identifying a data message record from among a set of stored message data records, wherein the identified data message record includes a second originating IP address, and wherein the second originating IP address matches the first originating IP address; parsing a data field within the identified data message record and extracting from the parsed data field, data that identifies the second originating IP address as legitimate or anomalous; and responding to determining based on the extracted data, that the second originating IP address is anomalous, initiating a processor implemented instance of a threat handling process flow; wherein: at least one stored message data record within the set of stored message data records, includes identifier data that identifies an originating IP address within said stored message data record as either legitimate or anomalous; and the identifier data within the stored message data record has been is generated, using the trained variational autoencoder, by performing the steps of: receiving request parameter data corresponding to a data message; encoding the message parameter data at an encoder within the trained variational autoencoder to generate encoded data; decoding the generated encoded data using a decoder within the trained variational autoencoder; determining a reconstruction error associated with output from the decoder; and generating identifier data (i) that identifies the originating IP address within said stored message data record as legitimate when the reconstruction error is less than a second error threshold, or (ii) that identifies the originating IP address within said stored message data record as anomalous when the reconstruction error is more than the second error threshold.

2. The method as claimed in claim 1, wherein a state of the identifier data within the stored message data record has been modified by performing the further steps of:

retrieving from a database, historical data identifying IP addresses that have been associated with anomalous activity; and responding to a determination that an IP address identified by the historical data as having been associated with anomalous activity matches the originating IP address within said stored message data record, by modifying the identifier data within the stored message data record to identify the originating IP address within said stored message data record as anomalous.

3. The method as claimed in claim 1, wherein a state of the identifier data within the stored message data record has been modified by performing the further steps of:

identifying a link between a first originating IP address within a first stored message data record, and a second originating IP address within a second stored message data record; and in response to determining that the first originating IP address has been identified as anomalous, and that the second originating IP address has been identified as legitimate, modifying identifier data within the second stored message data record to identify the second originating IP address as anomalous.

4. The method as claimed in claim 3, wherein identifying the link between the first originating IP address within the first stored message data record, and the second originating IP address within the second stored message data record comprises:

generating a graph data structure that defines a set of nodes and a set of edges, wherein each node represents a stored message data record within the set of stored message data records, and wherein each edge represents a link between two originating IP address, each of the two originating IP addresses stored within a corresponding stored message data record within the set of stored message data records;

providing data representing the graph data structure as input to a graph neural network; and receiving from the graph neural network, output identifying the link between the first originating IP address within the first stored message data record, and the second originating IP address within the second stored message data record.

5. The method as claimed in claim 1, wherein the reconstruction error comprises a determined difference between the message parameter data and the reconstructed message parameter data that is output from the decoder.

6. A system for detection of anomalous activity by a remote entity over a communication network, the system comprising at least a processor implemented variational autoencoder and a processor implemented graph neural network, wherein the system is configured to perform the steps of: iteratively training a variational autoencoder, using a training data set comprising message parameter data extracted from data messages received from a plurality of remote entities that are identified as legitimate entities, the iterative training continuing until a measured reconstruction error associated with the variational autoencoder does not exceed a first reconstruction error threshold; receiving a first data message from a remote entity, wherein said first data message includes a first originating internet protocol (IP) address; identifying a data message record from among a set of stored message data records, wherein the identified data message record includes a second originating IP address, and wherein the second originating IP address matches the first originating IP address; parsing a data field within the identified data message record and extracting from the parsed data field, data that identifies the second originating IP address as legitimate or anomalous; and responding to determining based on the extracted data, that the second originating IP address is anomalous, initiating a processor implemented instance of a threat handling process flow; wherein: at least one stored message data record within the set of stored message data records, includes identifier data that identifies an originating IP address within said stored message data record as either legitimate or anomalous; and the identifier data within the stored message data record has been generated, using the trained variational autoencoder, by performing the steps of: receiving request parameter data corresponding to a data message; encoding the message parameter data at an encoder within the trained variational autoencoder to generate encoded data; decoding the generated encoded data using a decoder within the trained variational autoencoder; determining a reconstruction error associated with output from the decoder; and generating identifier data (i) that identifies the originating IP address within said stored message data record as legitimate when the reconstruction error is less than a second error threshold, or (ii) that identifies the originating IP address within said stored message data record as anomalous when the reconstruction error is more than the second error threshold.

7. The system as claimed in claim 6, wherein a state of the identifier data within the stored message data record has been modified by performing the further steps of:

retrieving from a database, historical data identifying IP addresses that have been associated with anomalous activity; and responding to a determination that an IP address identified by the historical data as having been associated with anomalous activity matches the originating IP address within said stored message data record, by modifying the identifier data within the stored message data record to identify the originating IP address within said stored message data record as anomalous.

8. The system as claimed in claim 6, wherein a state of the identifier data within the stored message data record has been modified by performing the further steps of:

identifying a link between a first originating IP address within a first stored message data record, and a second originating IP address within a second stored message data record; and in response to determining that the first originating IP address has been identified as anomalous, and that the second originating IP address has been identified as legitimate, modifying identifier data within the second stored message data record to identify the second originating IP address as anomalous.

9. The system as claimed in claim 8, wherein identifying the link between the first originating IP address within the first stored message data record, and the second originating IP address within the second stored message data record comprises:

generating a graph data structure that defines a set of nodes and a set of edges, wherein each node represents a stored message data record within the set of stored message data records, and wherein each edge represents a link between two originating IP address, each of the two originating IP addresses stored within a corresponding stored message data record within the set of stored message data records;

providing data representing the graph data structure as input to the graph neural network; and receiving from the graph neural network, output identifying the link between the first originating IP address within the first stored message data record, and the second originating IP address within the second stored message data record.

10. The system as claimed in claim 6, wherein the reconstruction error comprises a determined difference between the message parameter data and the reconstructed message parameter data that is output from the decoder.

11. A computer program product for detection of anomalous activity by a remote entity over a communication network, the computer program product comprising a non-transitory computer readable medium having a computer readable program code embodied therein, wherein the computer readable program code comprises instructions for performing at, at least one processor, the steps of: iteratively training a variational autoencoder, using a training data set comprising message parameter data extracted from data messages received from a plurality of remote entities that are identified as legitimate entities, the iterative training continuing until a measured reconstruction error associated with the variational autoencoder does not exceed a first reconstruction error threshold; receiving a first data message from a remote entity, wherein said first data message includes a first originating internet protocol (IP) address; identifying a data message record from among a set of stored message data records, wherein the identified data message record includes a second originating IP address, and wherein the second originating IP address matches the first originating IP address; parsing a data field within the identified data message record and extracting from the parsed data field, data that identifies the second originating IP address as legitimate or anomalous; and responding to determining based on the extracted data, that the second originating IP address is anomalous, initiating a processor implemented instance of a threat handling process flow; wherein: at least one stored message data record within the set of stored message data records, includes identifier data that identifies an originating IP address within said stored message data record as either legitimate or anomalous; and the identifier data within the stored message data record has been generated, using the trained variational autoencoder, by performing the steps of: receiving request parameter data corresponding to a data message; encoding the message parameter data at an encoder within the trained variational autoencoder to generate encoded data; decoding the generated encoded data using a decoder within the trained variational autoencoder; determining a reconstruction error associated with output from the decoder; and generating identifier data (i) that identifies the originating IP address within said stored message data record as legitimate when the reconstruction error is less than a second predefined error threshold, or (ii) that identifies the originating IP address within said stored message data record as anomalous when the reconstruction error is more than the second error threshold.

12. The computer program product of claim 11, wherein a state of the identifier data within the stored message data record has been modified by performing the further steps of:

retrieving from a database, historical data identifying IP addresses that have been associated with anomalous activity; and responding to a determination that an IP address identified by the historical data as having been associated with anomalous activity matches the originating IP address within said stored message data record, by modifying the identifier data within the stored message data record to identify the originating IP address within said stored message data record as anomalous.

13. The computer program product of claim 11, wherein a state of the identifier data within the stored message data record has been modified by performing the further steps of:

identifying a link between a first originating IP address within a first stored message data record, and a second originating IP address within a second stored message data record; and in response to determining that the first originating IP address has been identified as anomalous, and that the second originating IP address has been identified as legitimate, modifying identifier data within the second stored message data record to identify the second originating IP address as anomalous.

14. The computer program product of claim 13, wherein identifying the link between the first originating IP address within the first stored message data record, and the second originating IP address within the second stored message data record comprises:

generating a graph data structure that defines a set of nodes and a set of edges, wherein each node represents a stored message data record within the set of stored message data records, and wherein each edge represents a link between two originating IP address, each of the two originating IP addresses stored within a corresponding stored message data record within the set of stored message data records;

providing data representing the graph data structure as input to a graph neural network; and receiving from the graph neural network, output identifying the link between the first originating IP address within the first stored message data record, and the second originating IP address within the second stored message data record.

15. The computer program product of claim 11, wherein the reconstruction error comprises a determined difference between the message parameter data and the reconstructed message parameter data that is output from the decoder.

16. The method as claimed in claim 1, wherein the threat handling process flow comprises at least one of quarantining of the received data message, or rejection of a data request or a service request represented within the received data message, or another security response.

17. The system as claimed in claim 6, wherein the threat handling process flow comprises at least one of quarantining of the received data message, or rejection of a data request or a service request represented within the received data message, or another security response.

18. The computer program product of claim 11, wherein the threat handling process flow comprises at least one of quarantining of the received data message, or rejection of a data request or a service request represented within the received data message, or another security response.

* * * * *